(12) United States Patent
Aono et al.

(10) Patent No.: US 6,819,484 B2
(45) Date of Patent: Nov. 16, 2004

(54) TOTAL INTERNAL REFLECTION ILLUMINATION APPARATUS AND MICROSCOPE USING THIS TOTAL INTERNAL REFLECTION ILLUMINATION APPARATUS

(75) Inventors: Yasushi Aono, Yokohama (JP); Tsuyoshi Mochizuki, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 42 days.

(21) Appl. No.: 10/286,639

(22) Filed: Nov. 1, 2002

(65) Prior Publication Data

US 2003/0086163 A1 May 8, 2003

(30) Foreign Application Priority Data

Nov. 6, 2001 (JP) ........................................ 2001-341007
Dec. 7, 2001 (JP) ........................................ 2001-374426

(51) Int. Cl.[7] .............................................. G02B 21/00
(52) U.S. Cl. ...................... 359/368; 359/385; 359/389; 359/388; 356/445; 356/237.1
(58) Field of Search .................................. 359/368, 372, 359/379, 381, 385, 388, 389; 356/445–448, 237.1–237.5

(56) References Cited

FOREIGN PATENT DOCUMENTS

JP          09-159922 A      6/1997
JP          10-096861 A      4/1998

*Primary Examiner*—Drew A. Dunn
*Assistant Examiner*—Joshua L Pritchett
(74) *Attorney, Agent, or Firm*—Frishauf, Holtz, Goodman & Chick, P.C.

(57) ABSTRACT

A total internal reflection illumination apparatus applied to a microscope which illuminates a sample through an objective having a numerical aperture enabling total internal reflection illumination, comprises a first total internal reflection mirror which is arranged in the vicinity of an outermost peripheral part of an observation optical path of the microscope to reflect an incident illumination light in a direction of the objective, a second total internal reflection mirror which is arranged at a symmetrical position with the first total internal reflection mirror to sandwich an observation optical axis and reflects return light reflected on a surface of the sample in a direction different from the illumination optical path, and a return light dimming part configured to dim the return light reflected by the second total internal reflection mirror.

12 Claims, 13 Drawing Sheets

TOTAL INTERNAL REFLECTION ILLUMINATION APPARATUS AND MICROSCOPE USING THIS TOTAL INTERNAL REFLECTION ILLUMINATION APPARATUS

CROSS-REFERENCE TO RELATED APPLICATIONS

This application is based upon and claims the benefit of priority from the prior Japanese Patent Applications No. 2001-341007, filed Nov. 6, 2001; and No. 2001-374426, filed Dec. 7, 2001, the entire contents of both of which are incorporated herein by reference.

BACKGROUND OF THE INVENTION

1. Field of the Invention

The present invention relates to a total reflection illumination apparatus applied to a microscope which illuminates a sample through an objective having a numerical aperture enabling total internal reflection illumination, and a microscope using this total internal reflection illumination apparatus.

2. Description of the Background Art

In recent years, functional analysis of a biological cell has been vigorously carried out. In such function analysis of cells, in order to observe a function of a cell membrane in particular, attention is drawn to a total internal reflection fluorescence microscopy (TIRFM) which acquires total internal reflection fluorescence images from the cell membrane and a nearby part.

In such a total internal reflection fluorescence microscopy (which will be referred to as a "microscope" hereinafter), a total internal reflection illumination which locally illuminates only a sample (which may be also referred to as a "specimen" in some cases) in the vicinity of the glass surface is used. In this microscope, when the illumination light is totally reflected on the interface between the cover glass and the specimen, a fluorescent material is excited by using the light called evanescent light which permeates in a small range of not more than several 100 nm on the specimen side. Therefore, only the fluorescence in a small range in the vicinity of the cover glass is observed. Accordingly, the background (scattered light or the like) is very dark, and the weak fluorescence can be observed (for example, observation of the fluorescence of one molecule of the fluorescent dye).

Meanwhile, in the fluorescence observation by using such a total internal reflection illumination, a permeation depth of the evanescent light which permeates from the glass surface to the sample side varies depending on a refractive index of the glass and others. Further, this permeation depth means a depth along which observation has been carried out, and it also varies depending on a purpose of a speculum user.

Thus, there is also considered varying an incidence angle of the illumination light from the glass to the sample in accordance with conditions of the specimen or a depth along which observation should be carried out.

Meanwhile, in case of performing fluorescence observation using the total internal reflection illumination, there is known a microscope which conducts the total internal reflection illumination which illuminates the sample through an objective.

For example, in such a microscope, a mirror which reflects the light from a light source to an objective side is moved, and an incidence position of the illumination light to the objective is continuously moved in a direction away from the optical axis of the objective. As a result, the incidence angle from the glass to the sample is continuously changed and the incident-light fluorescence illumination and the total internal reflection illumination are switched (see Jpn. Pat. Appln. KOKAI Publication No. 09-159922). It is to be noted that a micrometer or the like is generally used for movement of the mirror which reflects the illumination light, namely, adjustment of the incidence angle from the glass to the sample because fine adjustment is required.

Furthermore, in another microscope, a frame of the objective has a dual structure consisting of an inner frame and an outer frame, the light from the light source is reflected by an annular mirror so that the illumination light can pass between the inner frame and the outer frame in the dual structure. A sample is illuminated with that light, and the return light from the sample is observed through the objective (see Jpn. Pat. Appln. KOKAI Publication No. 10-96861).

In the above-described structure, in the total internal reflection illumination which performs illumination through the objective, the illumination light with which the specimen is irradiated returns to the objective in principle. Moreover, the mirror used to lead the illumination light to the objective side is provided in an observation optical path extending from the objective to observing means.

Therefore, the observation optical path of the fluorescence emitted from the specimen crosses the illumination light or the totally reflected return light. Therefore, the self-fluorescence generated on the illumination light or the totally reflected return light beam enters the observation light beam, and there is a possibility that a fluorescence observation image may be deteriorated.

In addition, since the illumination light and the totally reflected return light also cross each other, an interference fringe may be generated due to crossing of the laser beams when the laser beam is used as the illumination light, for example. An excellent fluorescence observation image can not be obtained due to the influence of the interference fringe.

Additionally, in the microscope disclosed in Jpn. Pat. Appln. KOKAI Publication No. 09-159922, the incident-light fluorescence illumination may be turned on at the time of adjusting the incidence angle from the glass to the sample when performing the fluorescence observation by the total internal fluorescence illumination in some cases. In this case, the mirror must be freshly moved to a position of the total internal reflection illumination. However, since the sample on the glass surface is irradiated with the incident-light illumination with the strong intensity as the exciting light during this movement, the entire sample may lose its color.

Further, although the micrometer or the like is used to move the mirror in the range from the incident-light fluorescence illumination to the total internal reflection illumination, since the micrometer has a small quantity of movement per one rotation of a rotation operation portion, the number of times of rotation increases when switching from the incident-light illumination to the total internal reflection illumination. Therefore, a lot of trouble is taken until this switching, thereby greatly reducing the operability of the fluorescence observation. Furthermore, this means that the entire sample may possibly lose its color during this switching when trying to switch from the incident-light fluorescence illumination to the total internal reflection illumination while irradiating the sample with the illumination exciting light.

BRIEF SUMMARY OF THE INVENTION

A total internal reflection illumination apparatus according to the first aspect of the present invention apparatus applied to a microscope which illuminates a sample through an objective having a numerical aperture enabling total internal reflection illumination, is characterized by comprising: a first total internal reflection mirror which is arranged in the vicinity of an outermost peripheral part of an observation optical path of the microscope to reflect an incident illumination light in a direction of the objective; a second total internal reflection mirror which is arranged at a symmetrical position with the first total internal reflection mirror to sandwich an observation optical axis and reflects return light reflected on a surface of the sample in a direction different from the illumination optical path; and a return light dimming part configured to dim the return light reflected by the second total internal reflection mirror.

A microscope according to the second aspect of the present invention is characterized by comprising: a light source which emits predetermined light; a total internal reflection illumination apparatus according to above-mentioned total internal reflection illumination apparatus, which irradiates a sample with the light from the light source through an objective; and an image pickup device which images the light from the sample as an image.

A microscope according to the third aspect of the present invention is characterized by comprising: a changing part configured to change an incidence angle of illumination light which is emitted onto a sample from a light source through an objective and enables switching between total internal reflection illumination and approximate total internal reflection illumination; and a restricting part configured to restrict the incidence angle of the illumination light to the sample through the objective to a range where total internal reflection illumination and approximate total internal reflection illumination can be obtained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments according to the present invention will now be described hereinafter with reference to the accompanying drawings.

Figure 1:
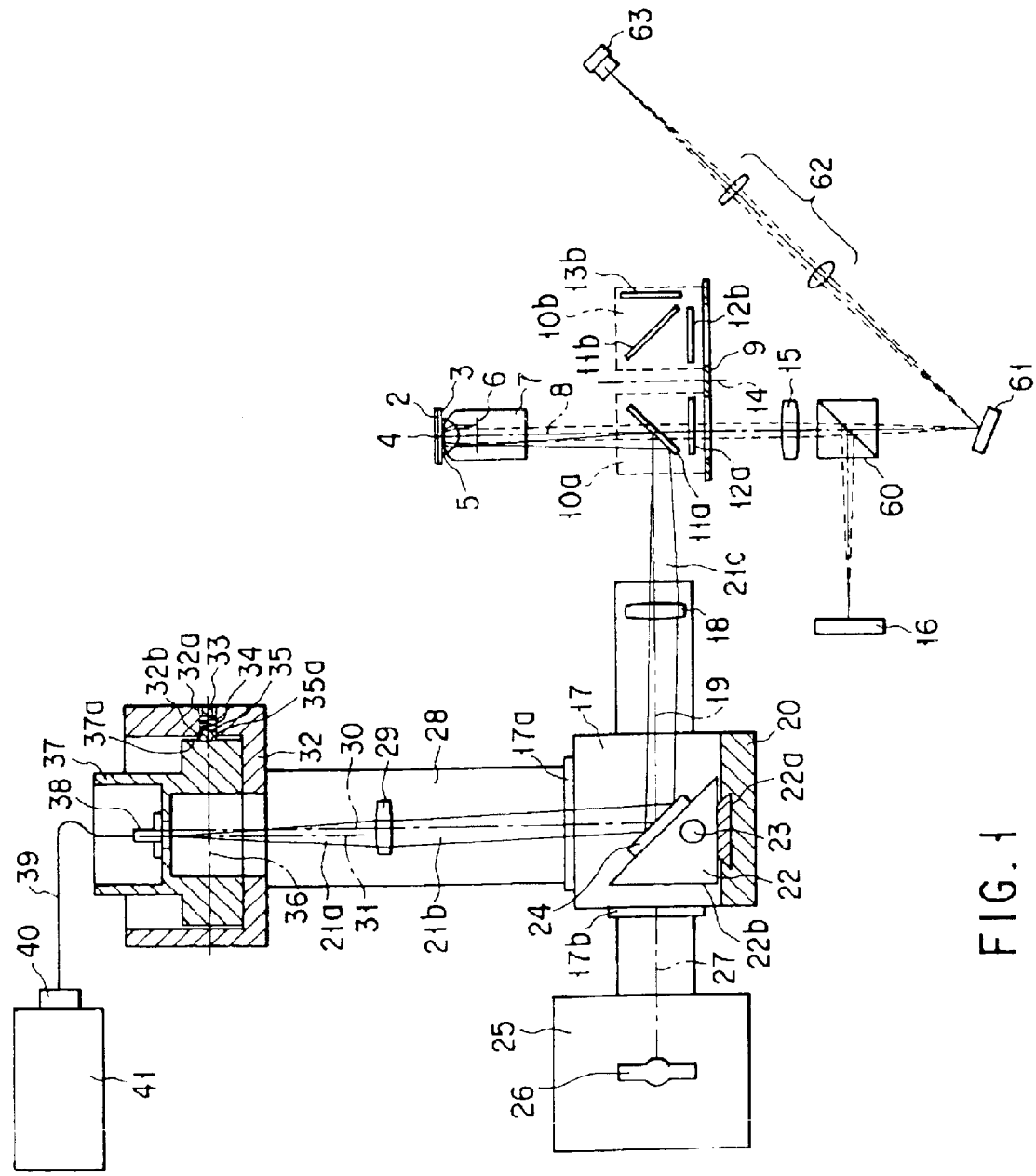
FIG. 1 is a schematic structural view for illustrating a scheme of a microscope according to the present invention.

FIG. 1 is a view for illustrating a scheme of total internal reflection fluorescence observation using a microscope. FIG. 1 shows an example where an inverted microscope is used and observation is carried out by an objective 7 arranged below a sample 2.

As shown in FIG. 1, a cover glass 3 is arranged on the lower side of the sample 2. The objective 7 is provided below the cover glass 3 through an immersion oil 5.

A mirror unit turret 9 which holds two or more fluorescence mirror units 10a and 10b and is capable of rotating (or linearly moving (only the rotational operation will be described thereafter) is arranged on an optical axis 8 of the objective 7. The fluorescence mirror units 10a and 10b corresponding to the total internal reflection illumination or the incident-light fluorescence illumination are selectively switched on the optical axis 8 by the rotational operation by a rotary shaft 14 of the mirror unit turret 9. In FIG. 1, the fluorescence mirror unit 10a corresponding to the total internal reflection illumination is switched on the optical axis 8. A high-reflection mirror 24 is arranged in the incidence light path of the fluorescence mirror units 10a and 10b. The high-reflection mirror 24 is fixed to a mirror holding portion 22 by, e.g., an adhesive. A dovetail portion 22a is provided to the mirror holding portion 22. The dovetail portion 22a is held in a dovetail groove portion 20 provided in an incident-light projection tube 17 so as to be capable of moving in a direction vertical to a page space in FIG. 1. The high-reflection mirror 24 can be moved in the direction vertical to the page space by moving in or out an operation knob 23 along the dovetail groove portion 20. In this case, as shown in FIG. 1, when the high-reflection mirror 24 is on the optical axis 19 of the incident-light projection tube 17, the light from a laser beam source 41 is reflected to the fluorescence mirror units 10a and 10b side.

The laser beam from the laser beam source 41 is led from an optical fiber incidence portion 40, and then outgoes from an optical fiber outgoing portion 38. The outgoing light 21a from the optical fiber outgoing portion 38 is converted into parallel light 21b by a collimator lens 29 of a fiber projection tube 28. The parallel light 21b is reflected by the high-reflection mirror 24, then condensed by a condenser lens 18, and led to the fluorescence mirror unit 10a. The fluorescence mirror unit 10a includes a dichroic mirror 11a and an absorption filter 12a. The light condensed by the condenser lens 18 is reflected by the dichroic mirror 11a and focalized at a rear side focal position 6 of the objective 7. The outgoing light from the end of the objective 7 enters a sample 2 from the cover glass 3. Here, evanescent light 4 which permeates in a range of several hundred nm from the interface with the cover glass 3 can be generated on the sample (low refractive index side) 2 by shifting the optical axis 31 of the outgoing light 21a from the optical fiber outgoing portion 38 in a direction vertical to the optical axis 30 of the fiber projection tube 28 in such a manner that an incidence angle of the incident light which is emitted from the end of the objective 7 and enters the sample (low refractive index side) 2 from the cover glass (high refractive index side) 3 becomes larger than a critical angle.

A fluorescent material in the sample 2 which exists in the vicinity of the surface of the cover glass 3 where the evanescence light 4 is generated is excited by the evanescence light 4 as the exciting light and produces the fluorescence. The fluorescence passes through the objective 7 and the dichroic mirror 11a, and the disadvantageous light in a wavelength band other than the fluorescence is eliminated therefrom by the absorption filter 12a. Then, the fluorescence is led to an observation image formation system 15, divided into two light paths by a half mirror 60. One divided fluorescence is image-formed on a high-sensitivity camera (CCD or the like) 16. The other one is transmitted through the half mirror 60, reflected by the mirror 61, and observed by an eyepiece 63. As a result, the fluorescent material in the sample 2 can be imaged or visually observed.

Figure 2:
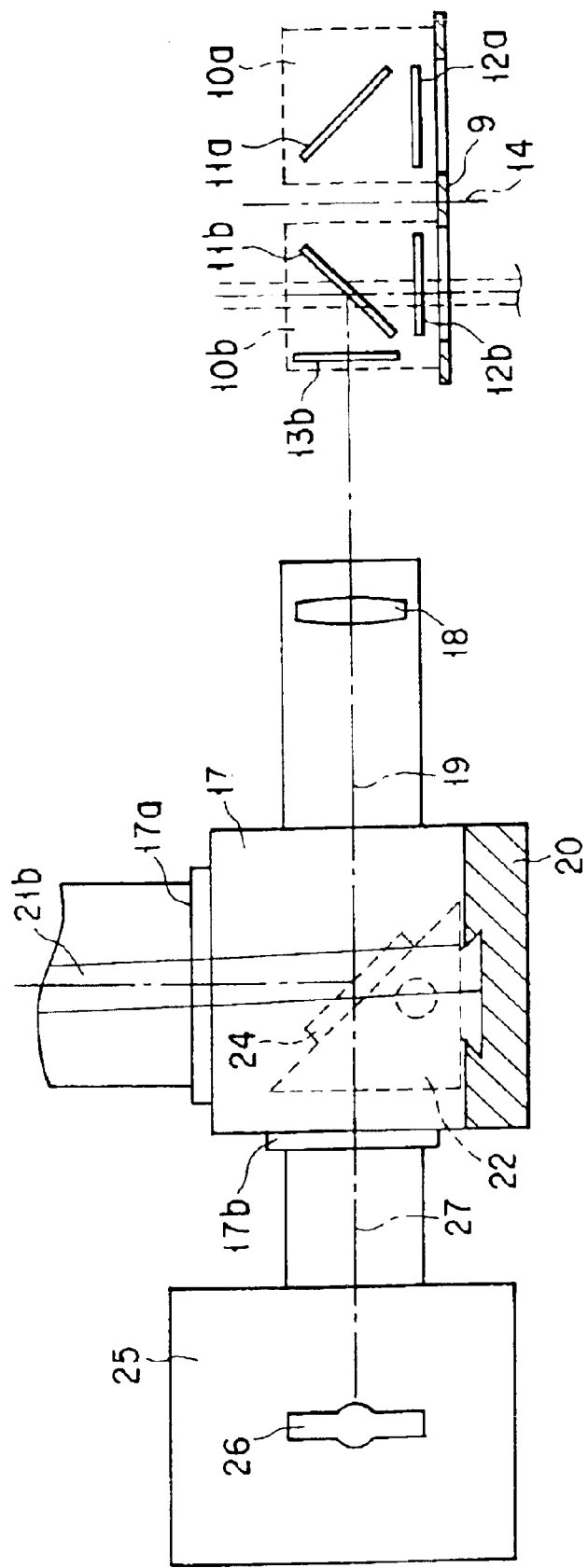
FIG. 2 is a schematic structural view for illustrating the regular fluorescence incident-light illumination of the microscope according to the present invention.

In case of performing the regular incident-light fluorescence illumination, as shown in FIG. 2, the high-reflection mirror 24 is removed from the optical axis 19 of the incident-light projection tube 17, and the fluorescence mirror unit 10a is switched to the fluorescence mirror unit 10b for the incident-light fluorescence illumination. The fluorescence mirror unit 10b includes a dichroic mirror 11b, an absorption filter 12b and an exciting filter 13b. The exciting filter 13b transmits therethrough only the exciting light in the light beams from a mercury burner 26 of a mercury lamp house 25. The exciting light transmitted through the exciting filter 13b is reflected by the dichroic mirror 11b and enters the objective 7. The outgoing light from the end of the objective 7 enters the sample 2 from the cover glass 3. The fluorescence from the fluorescent material in the sample 2 is transmitted through the dichroic mirror 11b, and the disadvantageous light in the wavelength band other than the fluorescence is removed therefrom by the absorption filter 12b. Then, the fluorescence is led to the observation image formation system 15, and divided into two light paths by the half mirror 60. One divided fluorescence is image-formed on the high-sensitivity camera (CCD or the like) 16. The other one is transmitted through the half mirror 60, reflected by the mirror 61 and observed by the eyepiece 63 through a relay optical system 62. As a result, the fluorescent material can be imaged or visually observed.

Description will now be given as to embodiments of the total internal reflection illumination apparatus according to the present invention applied to the microscope having the above-described structure.

First Embodiment

Figure 3:
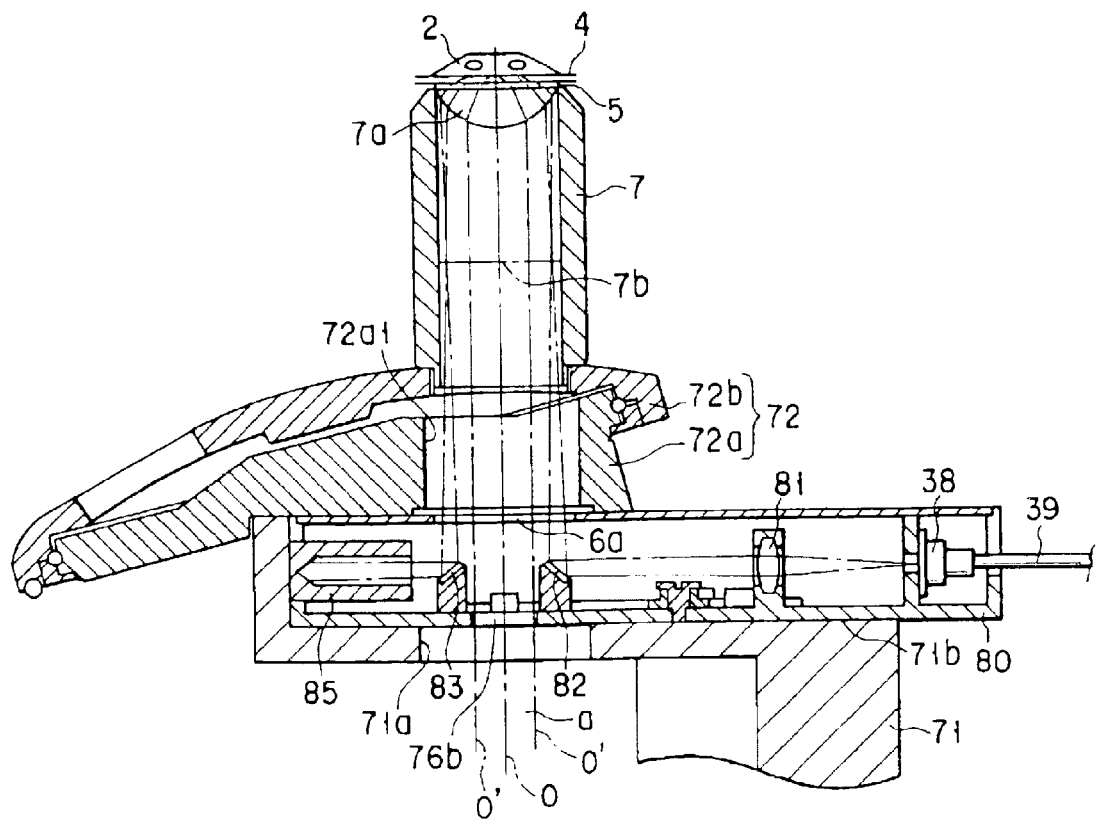
FIG. 3 is a view showing a schematic structure of a first embodiment according to the present invention.
Figure 4:
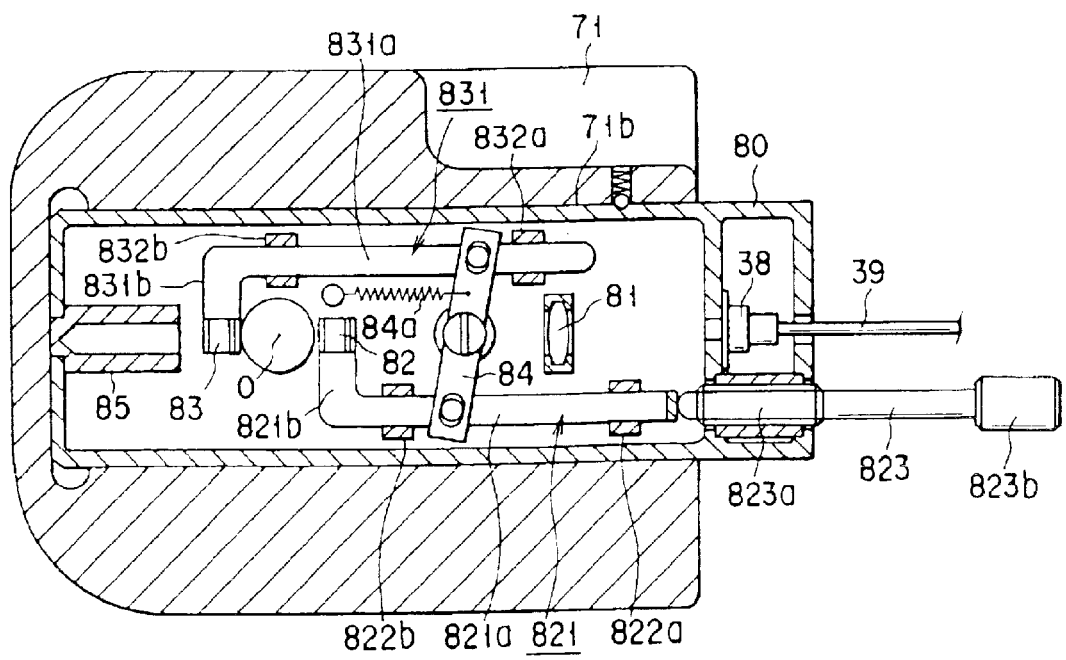
FIG. 4 is a view showing a schematic structure of a slider main body used in the first embodiment.

FIG. 3 is a view showing a schematic structure of a microscope to which the total internal reflection illumination apparatus according to a first embodiment of the present invention is applied. FIG. 3 is a view showing only the total internal reflection illumination apparatus and the vicinity of the objective to which the total internal reflection illumination apparatus is attached for the convenience's sake. It is to be noted that any other structure is basically the same as the above-described structure, thereby omitting illustration and explanation. FIG. 4 is a view showing a schematic structure of a slider main body used in the first embodiment.

In FIG. 3, an objective revolver holding base 71 is attached to a non-illustrated microscope main body.

A fixing portion 72a of the objective revolver 72 is held to the objective revolver holder base 71. A rotation portion 72b is rotatably provided to the fixing portion 72a of the objective revolver 72. A plurality of (only one in the drawing) objectives 7 are screwed and fixed to the rotation portion 72b. By rotating the rotation portion 72b, a desired objective 7 can be moved onto an observation optical axis O. In this case, circular hole portions 71a and 72a1 having at the center thereof the observation optical axis O running through the center of the objective 7 are provided to the objective revolver holding base 71 and the fixing portion 72a of the objective revolver 72.

The objective 7 has the numerical aperture enabling the total internal reflection illumination. An objective of the spotlight 7a is provided at the end of the objective 7. The objective of the spotlight 7a is arranged through the immersion oil 5 at a position opposed to the cover glass 3 having the specimen 2 mounted thereon.

A concave portion 71b is formed on the top face of the objective revolver holding base 71. A box-like slider main body 80 as a support member is provided to the concave portion 71b so as to be capable of being inserted or removed along the surface orthogonal to the observation optical axis O. Hole portions 6a and 76b through which the observation optical path a runs are formed to the slider main body 80 on the upper and lower surfaces thereof positioned on the observation optical axis O while being attached to the concave portion 71b of the objective revolver holding base 71.

An optical fiber outgoing portion 38 is fixed to the side surface of the slider main body 80.

A convex lens 81 is arranged in the slider main body 80 at a position opposed to the optical fiber outgoing portion 38. A first total internal reflection mirror 82 is arranged on the light path of the light which is transmitted through a convex lens 81 and converged.

The convex lens 81 converts the scattered light beam emitted from the optical fiber 39 into the convergent light beam. The convex lens 81 has such a focal distance as that the light reflected in the direction of the objective 7 by the first total internal reflection mirror 82 is focalized at the rear side focal position 7b of the objective 7.

Furthermore, the first total internal reflection mirror 82 is arranged in the vicinity of the outermost peripheral part of the observation optical path a and reflects the convergent light beam transmitted through the convex lens 81 in the direction of the objective 7. The reflected light moves along the observation optical axis O in the vicinity of the outermost peripheral part of the inner space of the objective 7.

A second total internal reflection mirror 83 is arranged at a position symmetrical with respect to the first total internal reflection mirror 82 so as to sandwich the observation optical axis O. The second total internal reflection mirror 83 reflects in the direction different from the observation optical path a the return light reflected on the surface of the specimen 2 and returned along the observation optical axis O in the vicinity of the outermost peripheral part of the inner space of the objective 7.

A light trap 85 as return light dimming part is arranged in the reflection direction of the second total internal reflection mirror 83. The light trap 85 dims the return light reflected by the second total internal reflection mirror 83.

As shown in FIG. 4, a first guide shaft 821 is provided to the first total internal reflection mirror 82. The first guide shaft 821 has a linear portion 821a and a bent portion 821b obtained by the end portion of the linear portion 821a substantially at right angles. The first total internal reflection mirror 82 is attached to the bent portion 821b. Moreover, the linear portion 821a of the first guide shaft 821 is supposed by a pair of guides 822a and 822b. By linearly moving the linear portion 821a along the guides 822a and 822b, the first total internal reflection mirror 82 can be moved toward or away from the observation optical axis O.

A second guide shaft 831 arranged in parallel with the first guide shaft 821 is provided to the second total internal reflection mirror 83. The second guide shaft 831 has a linear portion 831a and a bent portion 831b obtained by bending the end portion of the linear portion 831a substantially at right angles. The second total internal reflection mirror 83 is attached to the bent portion 831b. In addition, the linear portion 831a of the second guide shaft 831 is supported by a pair of guides 832a and 832b. By linearly moving the linear portion 831a along the guides 832a and 832b, the second total internal reflection mirror 83 can be moved toward or away from the observation optical axis O.

A link 84 is provided between the first guide shaft 821 and the second guide shaft 831. The intermediate portion of the link 84 is rotatably supposed on the bottom surface of the slider main body 80. The both ends of the link 84 are rotatably attached to the linear portion 821a of the first guide shaft 821 and the linear portion 831a of the second guide shaft 831, respectively. As a result, the second guide shaft 831 moves in the direction opposed to the movement direction of the first guide shaft 821 with respect to movement of the first guide shaft 821.

Additionally, a spring 84a is provided to the link 84 at a position between the link 84 and the bottom surface of the slider main body 80. This spring 84a constantly gives the link 84a running torque in the counterclockwise direction.

An operation shaft 823 pierces a screw portion 823a and is provided to the side surface of the slider main body 80. The operation shaft 823 is in contact with the end portion of the first guide shaft 821. A quantity of screwing of the screw portion 823a is adjusted by operation of a knob 823b, and the first guide shaft 821 is linearly moved. As a result, the first total internal reflection mirror 82 and the second total internal reflection mirror 83 can be moved close to or away from the observation optical axis O while maintaining the positional relationship of symmetry so as to sandwich the observation optical axis O.

The operation of the first embodiment having the above-described structure will now be described.

When the light is emitted from the optical fiber outgoing portion 38, it becomes the scattered light beam and enters the convex lens 81. The scattered light beam which has entered the convex lens 81 is converted into the convergent light beam, then reflected in the direction of the objective 7 by the first total internal reflection mirror 82, and moves along the observation optical axis O in the vicinity of the outermost part of the inner space of the objective 7. Then, the light beam is focalized at the rear side focal position 7b of the objective 7, again becomes the scattered light beam, and is transmitted through the objective of the spotlight 7a. Thereafter, the light beam becomes the parallel light beam inclined with respect to the observation optical axis O and outgoes from the objective 7. Then, it is transmitted through the immersion oil 5 and the cover glass 3, and the specimen 2 is irradiated with this light.

Here, when the operation shaft 823 is rotated by the operation of the knob 823b, the first guide shaft 821 and the second guide shaft 831 linearly move in the opposite directions in accordance with a quantity of screwing of the screw portion 823a. The first total internal reflection mirror 82 ad the second total internal reflection mirror 83 are subjected to positional adjustment in the direction to move closer to or away from the observation optical axis O while maintaining the positional relationship of symmetry with respect to the observation optical axis O. As a result, the distance of the light beam which moves in the inner space of the objective 7 from the observation optical axis O varies, and the inclination angle of the parallel light beam outgoing from the objective 7 changes. That is, the total internal reflection illumination can be obtained by changing the inclination angle of the parallel light beam outgoing from the objective 7 by rotating the knob 823b of the operation shaft 823 and setting this inclination angle equal to or above a critical angle.

On the other hand, the light beam totally reflected on the surface of the specimen 2 again enters the objective 7 as the return light, is focalized at the rear side focal position 7b of the objective 7, all reflected by the second total internal reflection mirror 83, led to the light trap 85 and terminated.

In this state, when the fluorescence is emitted from the specimen 2, this florescence moves in the observation optical path a along the observation optical axis O as an observation light beam O'. The observation light beam O' at this moment is led to the observation side without crossing the illumination light beam reflected by the first total internal reflection mirror 82 or the return light beam which enters the second total internal reflection mirror 83. Additionally, the illumination light beam with which the specimen 2 is irradiated and the return light beam after total internal reflection do not cross each other on the observation optical path a and they are eliminated from the observation optical path a.

Therefore, according to the above-described structure, the observation light beam O' of the fluorescence emitted from the specimen 2 can be set so as not to cross the illumination light beam reflected by the first total internal reflection mirror 82 or the return light beam entering the second total internal reflection mirror 83 on the observation optical path a. Accordingly, the self-fluorescence generated on the illumination light beam or the return light beam can be prevented from entering the observation light beam O', thereby greatly suppressing deterioration of the fluorescence observation image. Further, since the illumination light beam with which the specimen 2 is irradiated and the return light beam after total internal reflection do not cross each other, the interference fringe generated due to crossing of the laser beams can be prevented, thereby constantly assuring the excellent fluorescence observation image.

It is to be noted that the interlocking mechanism constituted by the first guide shaft 821, the second guide shaft 831 and the link 84 are used as a movement part of the first total internal reflection mirror 82 and the second total internal reflection mirror 83 is used in the first embodiment but the present invention can be embodied by using any other moving parts, e.g., using an electric motor in place of the interlocking mechanism. Further, the convex lens 81 is of the fixed type, but it may be capable of moving along the illumination light beam, thereby enabling the precise optical adjustment.

Figure 5:
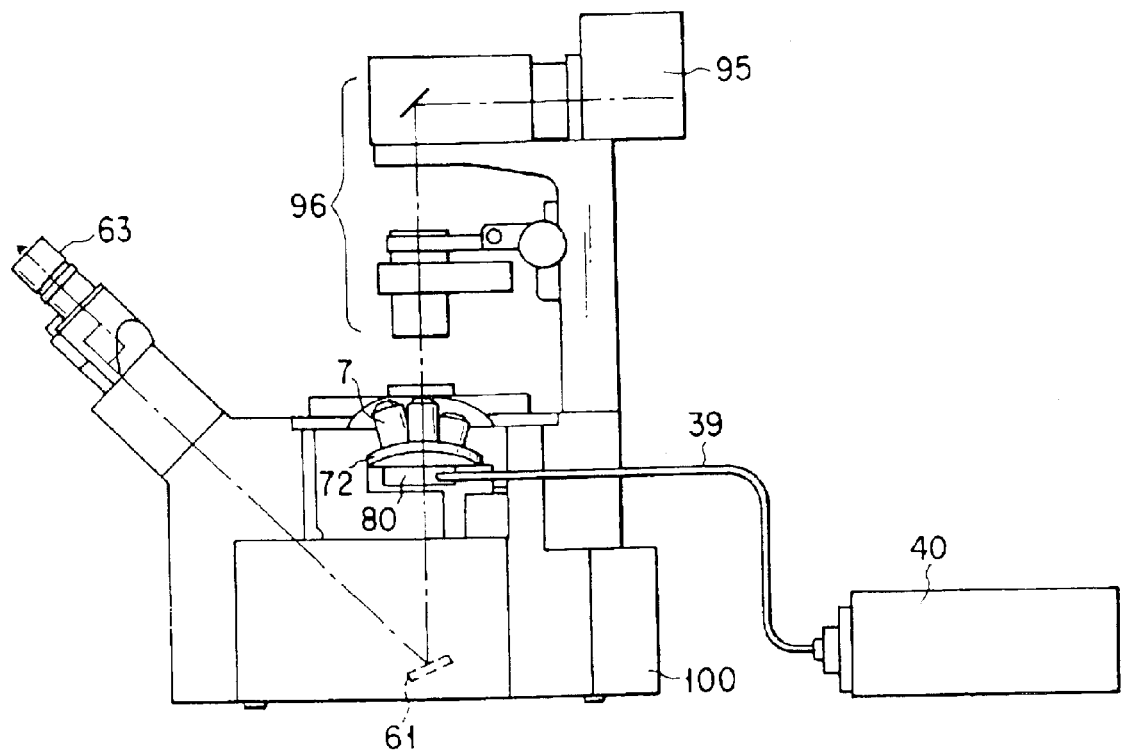
FIG. 5 is an overview diagram when a total internal reflection illumination apparatus according to the first embodiment is applied to an inverted microscope.
Figure 6:
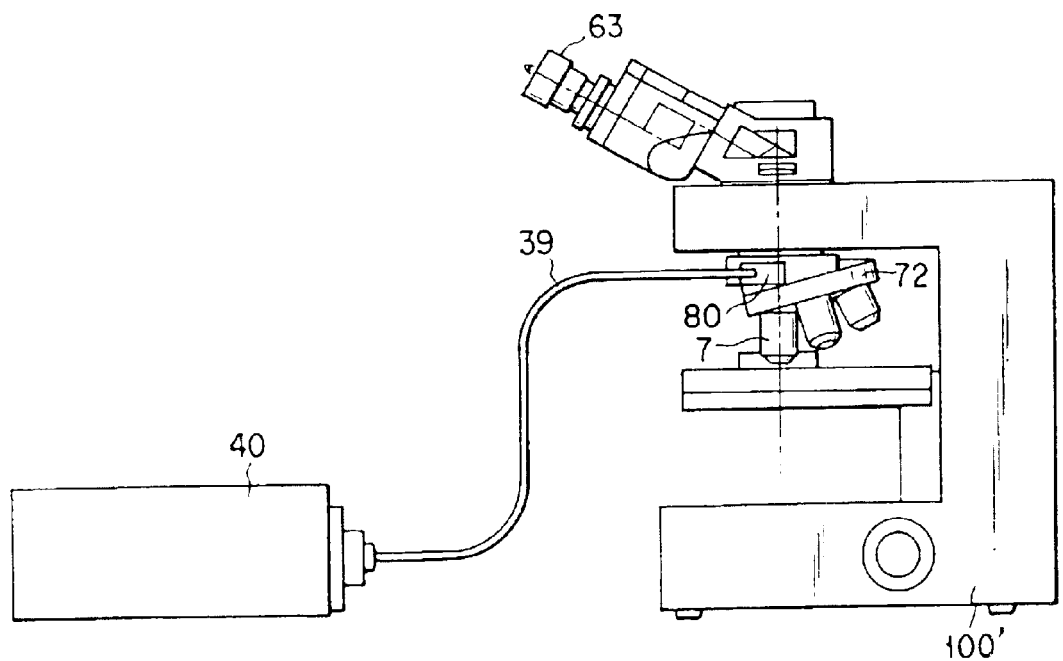
FIG. 6 is an overview diagram when the total internal reflection illumination apparatus according to the first embodiment is applied to an microscope with upright frame.

FIGS. 5 and 6 show the schematic structures obtained when the total internal reflection illumination apparatus according to the first embodiment having the above-described structure is applied to inverted microscope and microscope with upright frame. FIG. 5 is a view when the total internal reflection illumination apparatus is applied to the inverted microscope, and FIG. 6 is a view when the total internal reflection illumination apparatus is applied to the microscope with upright frame. Incidentally, in FIGS. 5 and 6, like reference numerals denote parts equal to those in FIGS. 1 to 4, thereby omitting the detailed description.

As shown in FIG. 5, in the inverted microscope, a light source for incident-light illumination is arranged above a stand 100, and regular observation of a sample is carried out with the eyepiece 63 by illuminating the sample 2 on the cover glass 3 through an incident-light optical system 96. In this case, the sample 2 is not illuminated with the laser beam from the laser beam source 41 using the slider main body 80. Further, when performing observation by the total internal reflection illumination using the total internal reflection illumination apparatus, the fluorescence from the sample 2 is observed by performing the total internal reflection illumination to the sample 2 with the laser beam from the laser beam source 41 (or image pickup is carried out by a non-illustrated image pickup device).

In case of FIG. 6, the illumination from a non-illustrated light source is emitted toward the upper direction from the lower part of the stand 100' along the optical axis of the objective 7. Any other structure is substantially the same with as of FIG. 5, thereby omitting the description.

Second Embodiment

Figure 7:
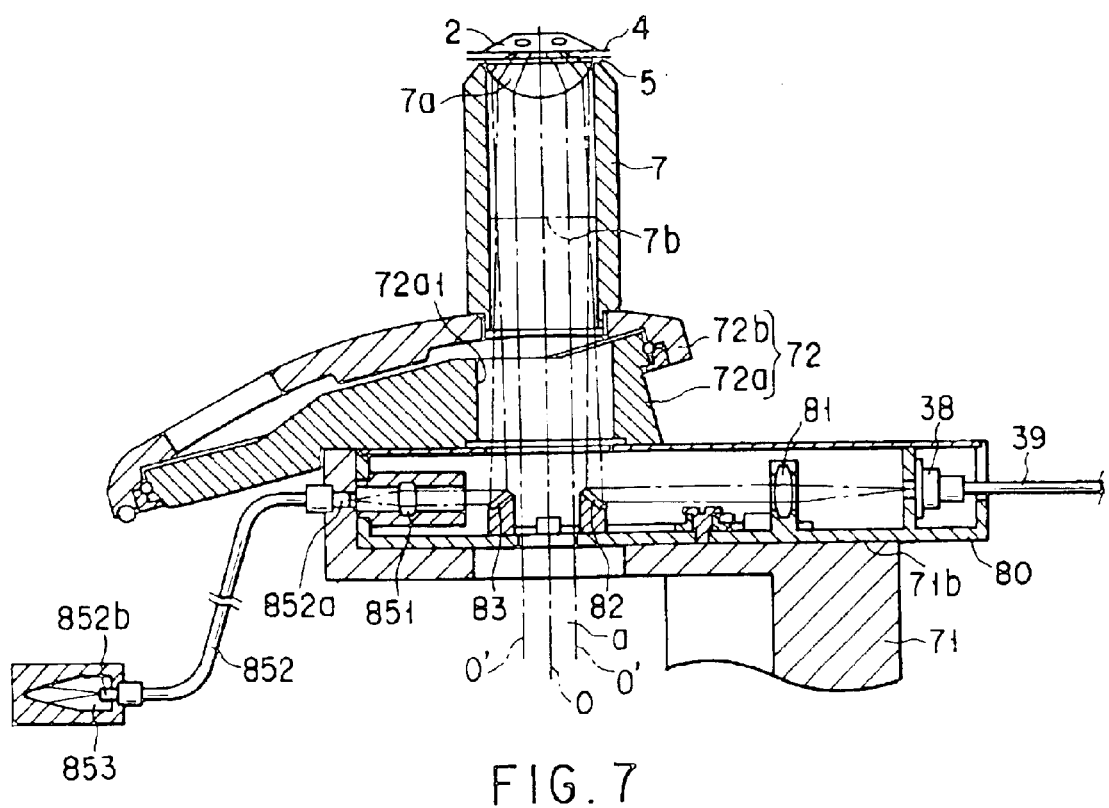
FIG. 7 is a view showing a schematic structure of a second embodiment according to the present invention.

FIG. 7 is a view showing a schematic structure of a microscope to which a total internal reflection illumination apparatus according to a second embodiment of the present invention is applied. In FIG. 7, like reference numerals denote parts equal to those in FIG. 3, thereby omitting the detailed explanation.

In the second embodiment, the convex lens 851 is arranged on the reflected light path of the second total internal reflection mirror 83. The convex lens 851 is used to again converge the return light subjected to total internal reflection by the second total internal reflection mirror 83. An incidence end 852a of the optical fiber 852 is positioned at a focal position of the return light obtained by the convex lens 851. In this case, the incidence end 852a of the optical fiber 852 has a sufficiently large core diameter in such a manner that the light can be assuredly led into the fiber even if the focal position of the return light slightly deviates. Furthermore, the light trap 853 is connected to an outgoing end 22b of the optical fiber 852. This light trap 853 is set outside the microscope.

Description will be given as to the operation of the second embodiment having the above-described structure.

The light beam totally reflected by the surface of the specimen 2 again enters the objective 7 as the return light, and is focalized at the rear side focal position 7b of the objective 7. Thereafter, the return light is all reflected by the second total internal reflection mirror 83 and enters the convex lens 851. Then, the return light is transmitted through the convex lens 851, again becomes the convergent light beam, enters the incidence end 852a of the optical fiber 852, and is terminated at the light trap 853 provided outside the microscope.

By doing so, the advantages like those in the first embodiment can be obtained. Moreover, since the return light beam reflected by the second total internal reflection mirror 83 is positively taken out to the outside of the microscope by using the optical fiber, the possibility of permeation of the scattered light of the return light beam into the observation optical path a can be greatly reduced, thereby assuring the further excellent fluorescence observation image.

Third Embodiment

Figure 8:
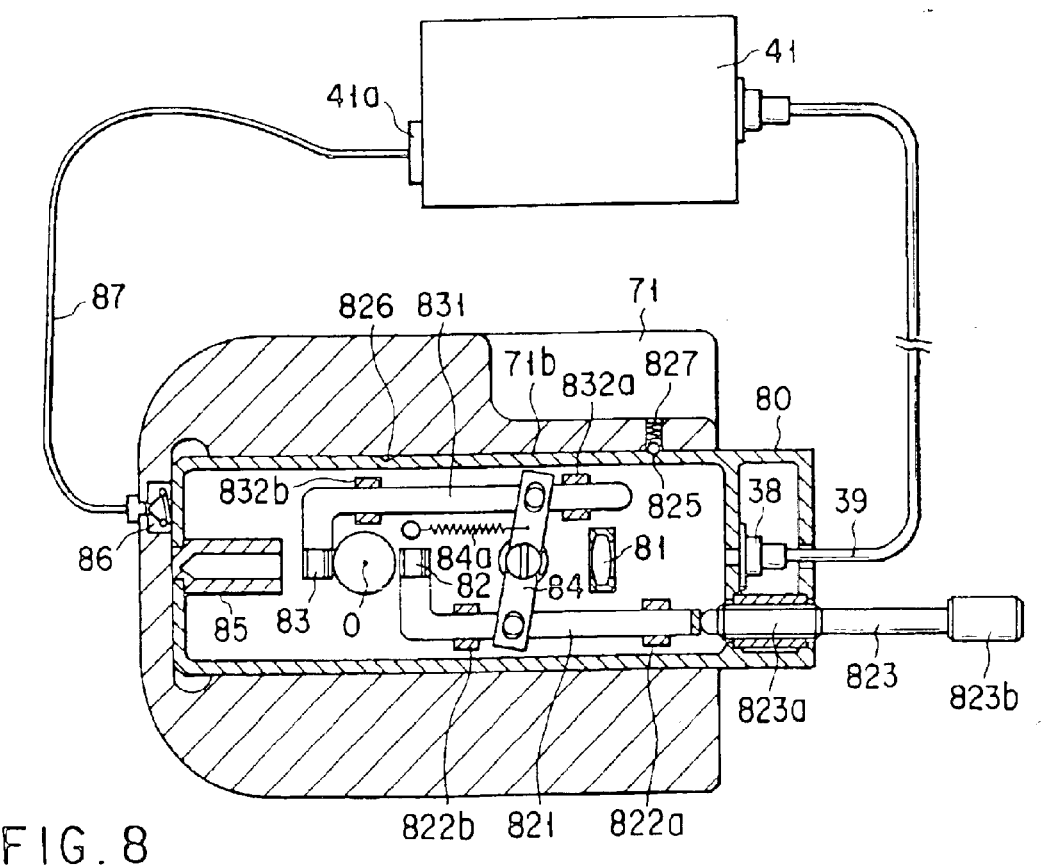
FIG. 8 is a view showing a schematic structure of a slider main body used in a third embodiment according to the present invention.
Figure 9:
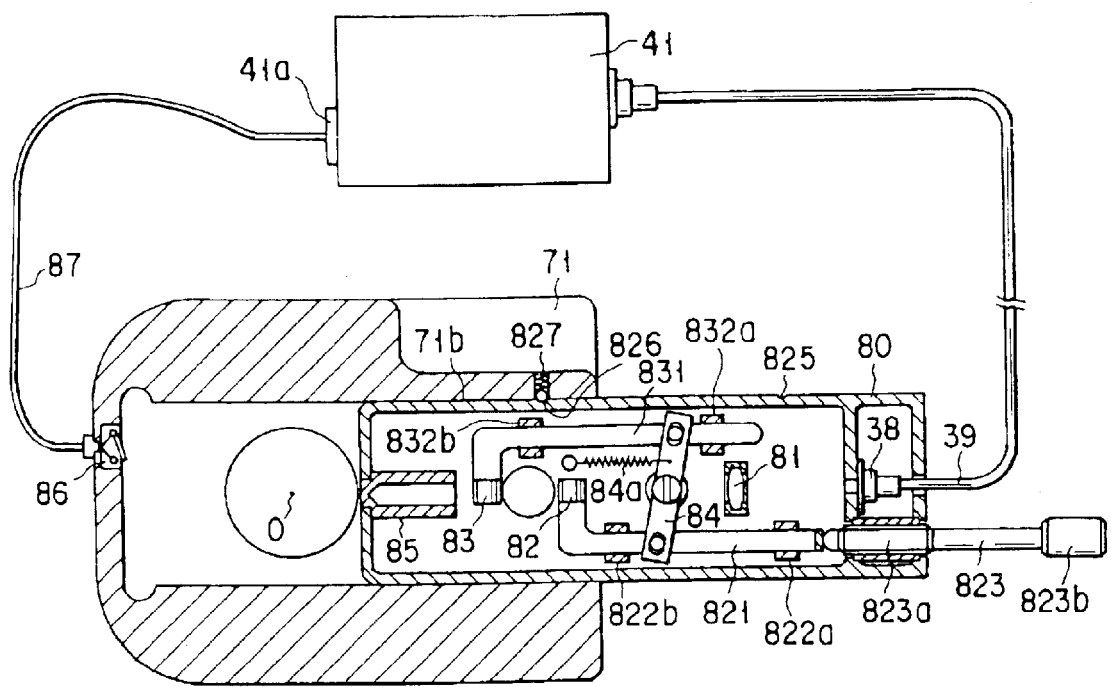
FIG. 9 is a view showing a schematic structure of a slider main body used in the third embodiment.

FIGS. 8 and 9 are views showing a schematic structure of a slider main body according to a third embodiment of the present invention. In FIGS. 8 and 9, like reference numerals denote parts equal to those in FIG. 4, thereby omitting the detailed explanation.

In FIGS. 8 and 9, a pair of click grooves 825 and 826 provided with a predetermined gap therebetween along the side surface which is in contact with the concave portion 71b to the slider main body 80 disposed so as to be capable of being inserted to or removed from the concave portion 71b of the objective revolver holding base 71. Moreover, a ball plunger 827 is provided on the side surface of the objective revolver holding base 71 on the concave portion 71b side, with which the slider main body 80 is in contact.

The ball plunger 827 constantly presses the side surface of the slider main body 80, and positions the slider main body 80 when fitted in the click grooves 825 and 826. When the slider main body 80 is inserted to reach the observation optical axis O as shown in FIG. 8, the ball plunger 827 is fitted in the click groove 825. When the slider main body 80 is moved away from the observation optical axis O as shown in FIG. 9, the ball plunger 827 is fitted in the click groove 826.

A micro switch 86 is arranged to the concave portion 71b of the objective revolver holding base 71 at a position where it is pressed by the end of the slider main body 80. The micro switch 86 is pressed and becomes conductive when the slider main body 80 is being inserted in the observation optical axis O as shown in FIG. 8.

An interlocking terminal 41a of a laser oscillator 41 is connected to an output terminal of the micro switch 86 through a cable 87. The laser oscillator 41 oscillates when interlocking is released by conduction of the micro switch 86, and generates the laser beam. The laser beam is led to the slider main body 80 through the optical fiber 39.

The operation of the third embodiment having such a structure will now be described.

As shown in FIG. 8, when the slider main body 80 is inserted onto the observation optical axis O, the ball plunger 827 is fitted in the click groove 825, and the slider main body 80 is held so as not to easily move. When the micro switch 86 is pressed by the end of the slider main body 80 and becomes conductive in this state, the interlocking of the laser oscillator 41 is released, and the laser beam is generated. The laser beam is led to the slider main body 80 through the optical fiber 39, and the operation like that described in connection with the first embodiment can be obtained.

On the other hand, as shown in FIG. 9, when the slider main body 80 is moved away from the observation optical axis O, the ball plunger 827 is fitted in the click groove 826, and the slider main body 80 is held so as not to easily move. In this state, since the micro switch 86 is opened, the interlocking of the laser oscillator 41 connected to the cable 87 is actuated, thereby generating no laser beam.

Therefore, the advantages like those described in connection with the first embodiment can be obtained by doing so. Furthermore, when the slider main body 80 is removed from the observation axis O, the laser beam from the laser oscillator 41 can be automatically stopped surely. Thus, the scattered light by the reflection of the laser beam never permeates observation light axis O' and excellence can be maintained.

It is to be noted that the cable 87 is directly connected to the interlocking terminal 41a of the laser oscillator 41 in the third embodiment, the similar advantages can be obtained by inserting an electric shutter between the laser oscillator 41 and the optical fiber 39, connecting the cable 87 to the electric shutter and using a part of, e.g., combining the opening/closing operation of the electric shutter with the on/off operation of the micro switch 86.

Figure 10:
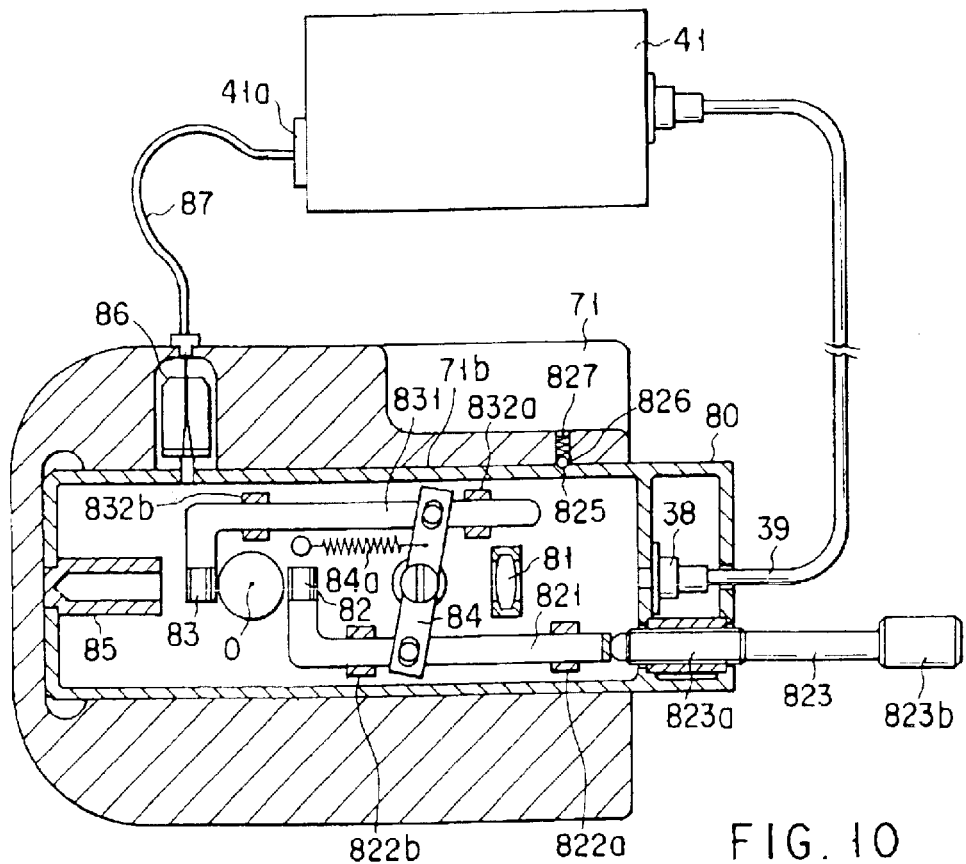
FIG. 10 shows a modification of the third embodiment.

Further, in the third embodiment, the micro switch 86 is configured to be pressed and conductive with the slider main body 80 being inserted into the observation optical axis O, but the micro switch 86 may be provided on the side surface of the inner wall as shown in FIG. 10. It is to be noted that the micro switch 86 may be of a contact type or it may be a proximity switch or the like in this case.

Figure 11:
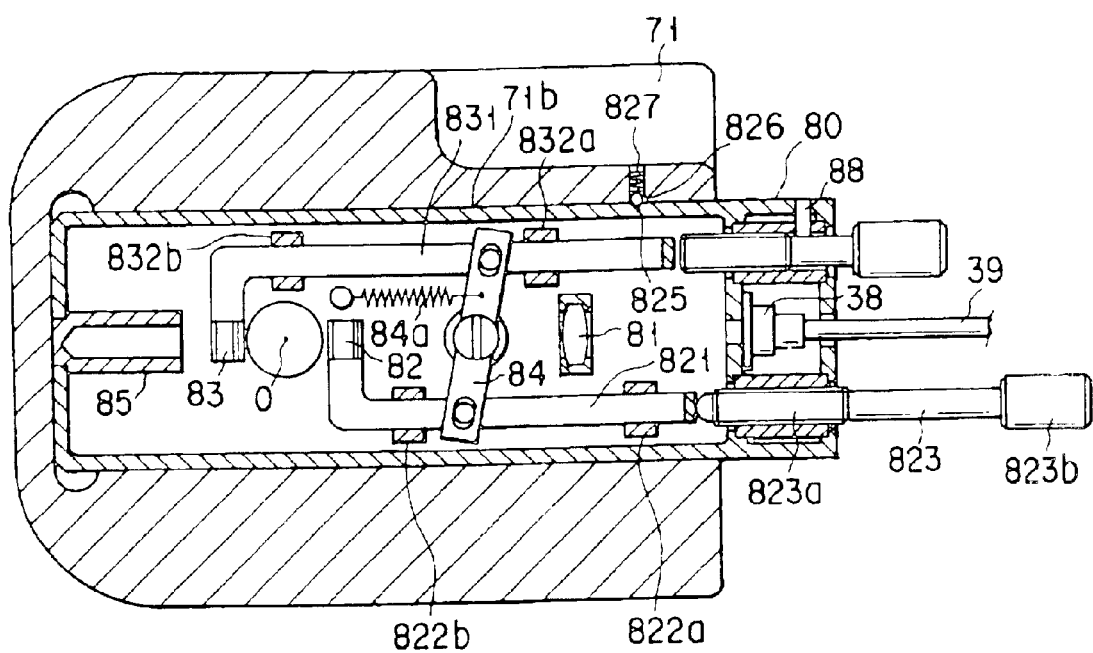
FIG. 11 is a modification of the first embodiment to the third embodiment.

In the first to third embodiments mentioned above, in the first guide shaft 821 and the second guide shaft 831 which is arranged in parallel with the first guide shaft 821, there is no structure which restricts a quantity of movement of these shafts. Accordingly, as shown in FIG. 11, there may be provided a stopper which restricts a quantity of movement of the first guide shaft 821 and the second guide shaft 831. This stopper can prevent the reflection mirror from moving in the optical axis direction in particular.

Although the micro switch 86 is arranged at a position where it is pressed by the end of the slider main body 80 in the third embodiment, the micro switch 86 may be provided at such a position as that it is pressed by the side surface of the slider main body 80 as shown in FIG. 10. The micro switch 86 may be provided at any position as long as it can detect insertion and removal of the slider main body 80 in this way. Moreover, any kind of the micro switch 86, e.g., a mechanical type, a proximity sensor or the like can be used.

In addition, in the first to third embodiments, the first guide shaft 821 and the second guide shaft 831 can be moved by the operation shaft 823 and the link 84, but a quantity of movement of the first guide shaft 821 and the second guide shaft 83 is restricted by providing a stopper 88 so as to come into contact with one of the second guide shaft 831 as shown in FIG. 11, and the first total internal reflection mirror 82 and the second total internal reflection mirror 83 do not move close to the optical axis more than necessary, thereby preventing damages to these members.

Fourth Embodiment

Figure 12A:
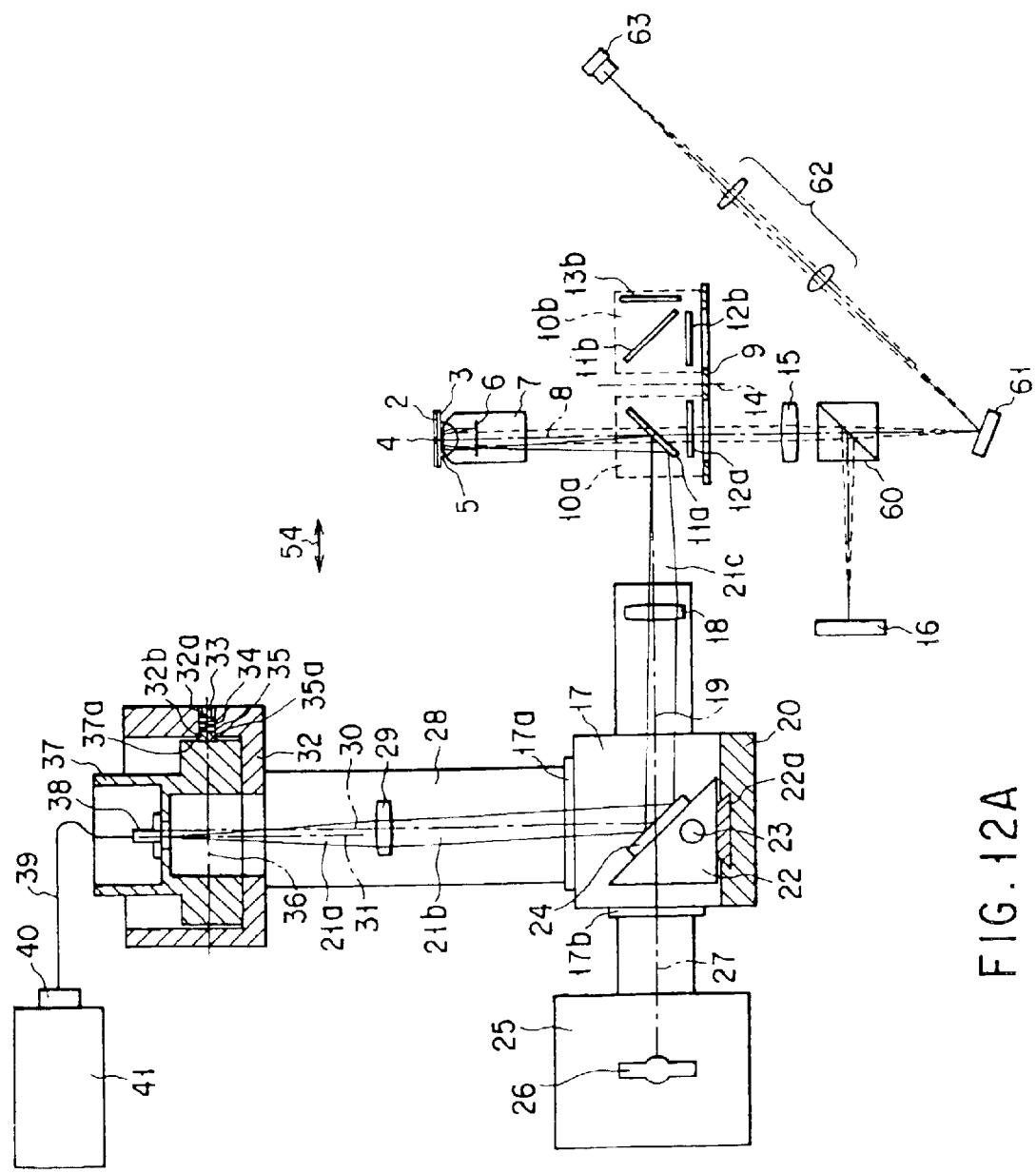
FIGS. 12A to 12C are views showing a schematic structure of a fourth embodiment according to the present invention.
Figure 12B:
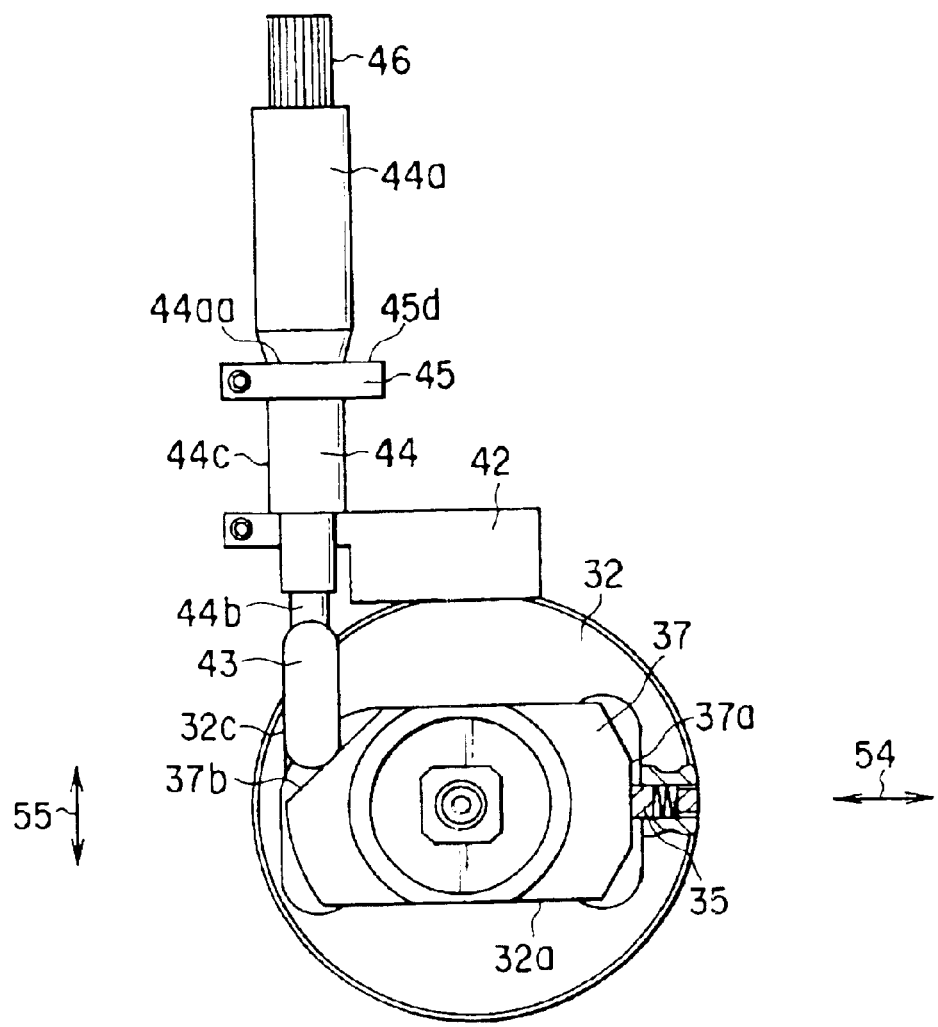
Figure 12C:
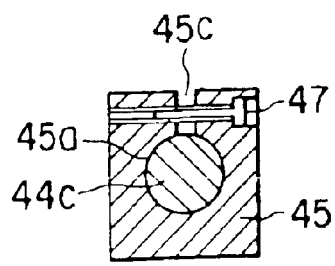

FIGS. 12A to 12C are views showing a schematic structure of a micro scope to which a fourth embodiment according to the present invention is applied. In FIGS. 12A to 12C, like reference numerals denote parts equal to those in FIG. 1, thereby omitting the detailed description.

The incident-light projection tube 17 is fixed to the inverted microscope main body (not shown). This incident-light projection tube 17 has a connection portion 17 relative to a fiber projection tube 28, and a connection portion 17b relative to a mercury lamp house 25 which holds the mercury burner 26. These members are respectively connected in such a manner that an optical axis 30 of the fiber projection tube 28 becomes orthogonal to an optical axis 19 of the incident-light projection tube 17 and an optical axis 27 of the mercury lamp house 25 coincides with the optical axis 19 of the incident-light projection tube.

In the incident-light projection tube 17, the high-reflection mirror 24 is fixed to the mirror holding portion 22 by an adhesive or the like so as to reflect the parallel beam 21b of the fiber projection tube 28 on the optical axis 19 of the incident-light projection tube 17. A dovetail portion 22a is provided to the mirror holding portion 22. The dovetail portion 22a is held in the dovetail groove portion 20 provided to the incident-light projection tube 17 so as to be capable of moving in the direction vertical to the page space, and the high-reflection mirror 24 can be moved in the direction vertical to the page space by moving in or out the operation knob 23 in the direction vertical to the page space from the outside of the incident-light projection tube 17. Moreover, the mirror holding portion 22 has a light shielding portion 22b provided on the side surface thereof on the mercury lamp house 25 side.

The fiber projection tube 28 is constituted by a collimator lens 29 and a fiber lead-in portion 32. The fiber lead-in portion 32 is connected to the end of the fiber projection tube 28 on the side opposite to the incident-light projection tube 17.

On the other hand, the outgoing light from the laser beam source 41 enters the optical fiber 39 from the optical fiber incidence portion 40, and the outgoing light 21a outgoes from the optical fiber outgoing portion 38. The optical fiber outgoing portion 38 is fixed to the movement portion 37 by a screw or the like (not shown). An outer side surface portion 37a of the movement portion 37 is fitted with an inner side surface portion 32a1 of the fiber lead-in portion 32 and can move in the horizontal direction of the page space 54.

Here, a screw hole 32a having a central line 36 in parallel with the horizontal direction of the page space 54 of the movement portion 37 and a fitting hole 32b are formed to the fiber lead-in portion 32, and a lid cylinder 33 having a screw portion is engaged with the screw hole 32a, and an adapter 35 is fitted in the fitting hole 32b.

In addition, a compression coil spring 34, which is compressed to be shorter than a natural length, as an elastic body is sandwiched between the lid cylinder 33 and the adapter 35, and the adapter 35 comes into contact with the outer side surface portion 37a of the movement portion 37. On the other hand, a slant surface contact portion 37b is provided on the opposite side to the outer side surface portion 37a of the movement portion 37.

A micrometer holding portion 42 is fixed to the fiber lead-in portion 32 by a screw or the like (not shown). The micrometer main body 44 is held to the micrometer holding portion 42 by a screw or the like (not shown).

The micrometer main body 44 has a knob 46 engage with the rotation portion 44a by a screw or the like (not shown). Additionally, a screw hole 32a and a cylindrical hole 32c which has a central line orthogonal to the central line of the fitting hole 32b are provided to the fiber lead-in portion 32, and a capsule adapter 43 is arranged being fitted in the cylindrical hole 32c and sandwiched between the slant surface contact portion 37b and the end portion 44b of the rotation portion 44a of the micrometer main body 44.

As a result, the knob 46 of the micrometer main body 44 is rotated, the slant surface contact portion 37b of the movement portion 37 is pressed by the capsule adapter 43 of the end portion 44b of the rotation portion 44a, and the movement portion 37 is moved against the pressing force of the compression coil spring 34. Consequently, the optical axis 31 of the outgoing light 21a from the optical fiber outgoing portion 38 can be shifted from the optical axis 30 of the fiber projection tube 28 (to the left side in the drawing) so as to be capable of adjusting an incidence angle of the incident light which outgoes from the end of the objective 7 and enters the sample (low refractive index side) 2 from the cover glass (high refractive index side) 3.

An opening portion 45a of a notch stopper 45 which has the opening portion 45a and an U-shaped notch portion 45c is fitted to the fixing portion 44c of the micrometer main body 44 as restricting part as shown in FIG. 12C. Additionally, a screw 47 which adjusts a gap of the U-shaped notch portion 45c is provided.

The operation of the fourth embodiment having such a structure will now be described.

The adapter 35 is in the state that the outer side surface portion 37a of the movement portion 37 is pressed by the compression coil spring 34. On the other hand, the end portion 44b can be moved in the vertical direction of the page space 55 by rotating the knob 46 of the micrometer main body 44, and the movement portion 37 can be moved in the horizontal direction of the page space 54 through the capsule adapter 43. As a result, the optical axis 31 of the outgoing light 21a from the optical fiber outgoing portion 38 can be adjusted in the vertical direction relative to the optical axis 30 of the fiber projection tube 28 while maintaining the horizontal state with respect to the optical axis 30 of the fiber projection tube 28.

At the same time, an angle of the incident light which is emitted from the end of the objective 7 and enters the sample 2 from the cover glass 3 can be also adjusted. Here, a position of the movement portion 37 is adjusted by rotating the knob 46 in such a manner that the incidence angle from the cover glass 3 to the sample 2 becomes slightly larger than the critical angle, and the side surface portion 45d of the notch stopper 45 is pressed against a contact portion 44aa of the rotation portion 44a of the micrometer main body 44 at this position. Further, a gap of the notch portion 45c of the notch stopper 45 is constricted by a screw 47, and the fixing portion 44c of the micrometer main body 44 is shut in by the opening portion 45a, thereby positioning and fixing the notch stopper 45 with respect to the micrometer main body 44.

Therefore, the movement portion 37 can not thereafter move the optical fiber outgoing portion 38 to the optical axis 30 side of the fiber projection tube 28 by restriction of the notch stopper 45, and movement is limited to that only in a range of the total internal reflection illumination that the incidence angle from the cover glass 3 to the sample 2 is larger than the critical angle.

On the other hand, although the light beam (not shown) from the mercury lamp house 25 is prevented by the light shielding portion 22b of the mirror holding portion 22, light beam (not shown) from the mercury burner 26 can be led to the incident-light projection tube 17 by drawing the operation knob 23 toward the front side in the vertical direction of the page space and removing the mirror holding portion 22 from the light path. At this moment, by rotating the mirror unit turret 9 around the rotary shaft 14, the regular incident-light fluorescence illumination observation can be enabled by arranging the fluorescence mirror unit 10b including the exciting filter 13b, the dichroic mirror 11b and the absorption filter 12 on the optical axis.

Therefore, according to the fourth embodiment, when adjusting the incidence angle from the cover glass 3 to the sample 2 by the notch stopper 45 fixed to the micrometer main body, this incidence angle is restricted in a range where it becomes larger than the critical angle, and hence the fluorescence observation can be performed by only the total internal reflection illumination. Therefore, it is possible to prevent color degradation of the entire sample due to the strong light of the incident-light fluorescence illumination, thereby obtaining the stable fluorescence observation by the total internal reflection illumination. Furthermore, since the incidence angle from the cover glass 3 to the sample 2 can be constantly adjusted in the range of the total internal reflection illumination, the operability can be improved. Moreover, the total internal reflection illumination and the incident-light fluorescence illumination can be rapidly switched by insertion and removal of the high-reflection mirror 24, and hence a factor of color degradation of the sample can be avoided when switching from the incident-light fluorescence illumination to the total internal reflection illumination (or vice versa) while keeping illumination of the sample with the illumination light.

It is to be noted that the inverted microscope has been described in the fourth embodiment but the similar advantages can be obtained when the present invention is applied to the microscope with upright frame.

Modification of Fourth Embodiment

Figure 13A:
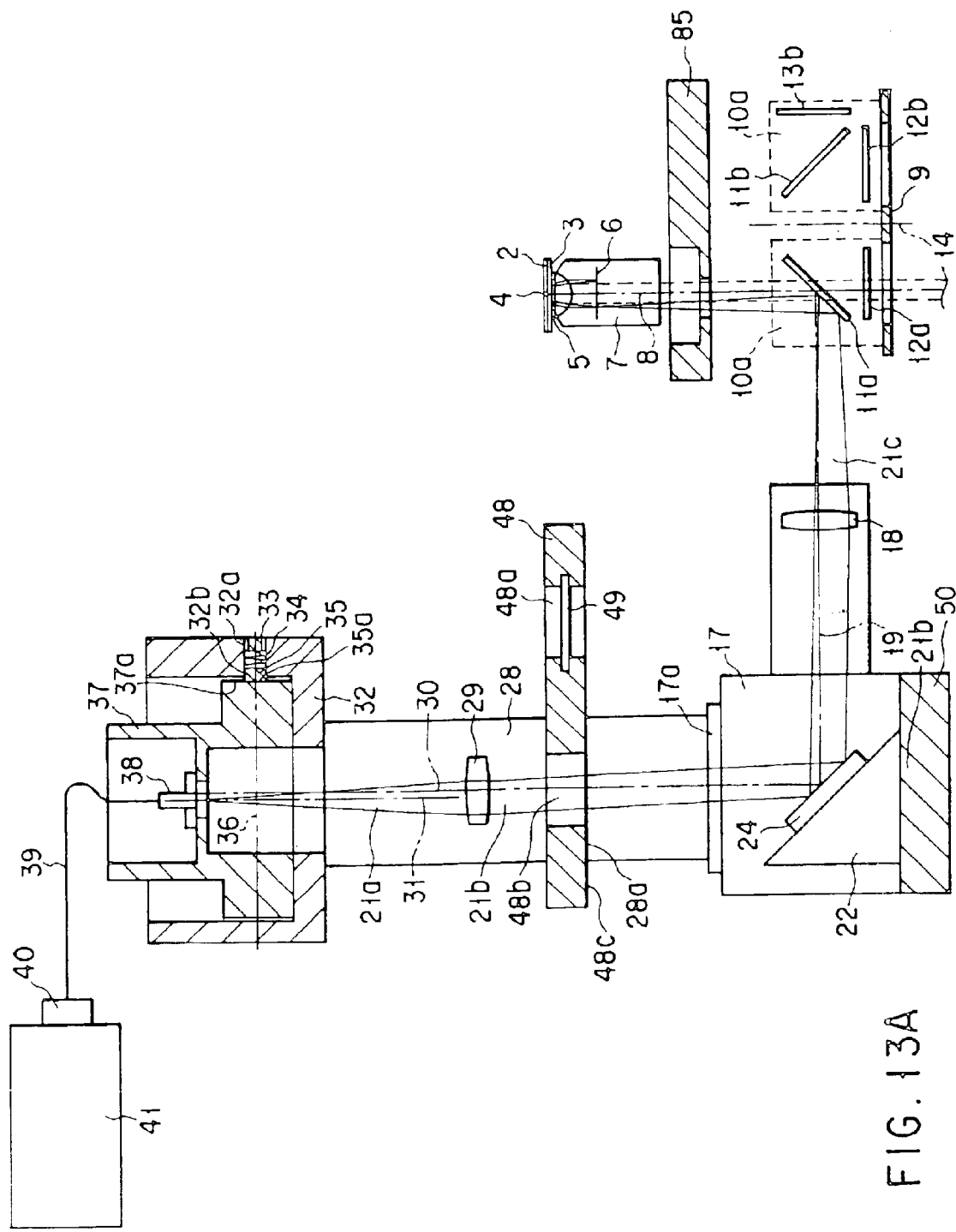
FIGS. 13A and 13B are views showing a schematic structure of a modification of the fourth embodiment according to the present invention.
Figure 13B:
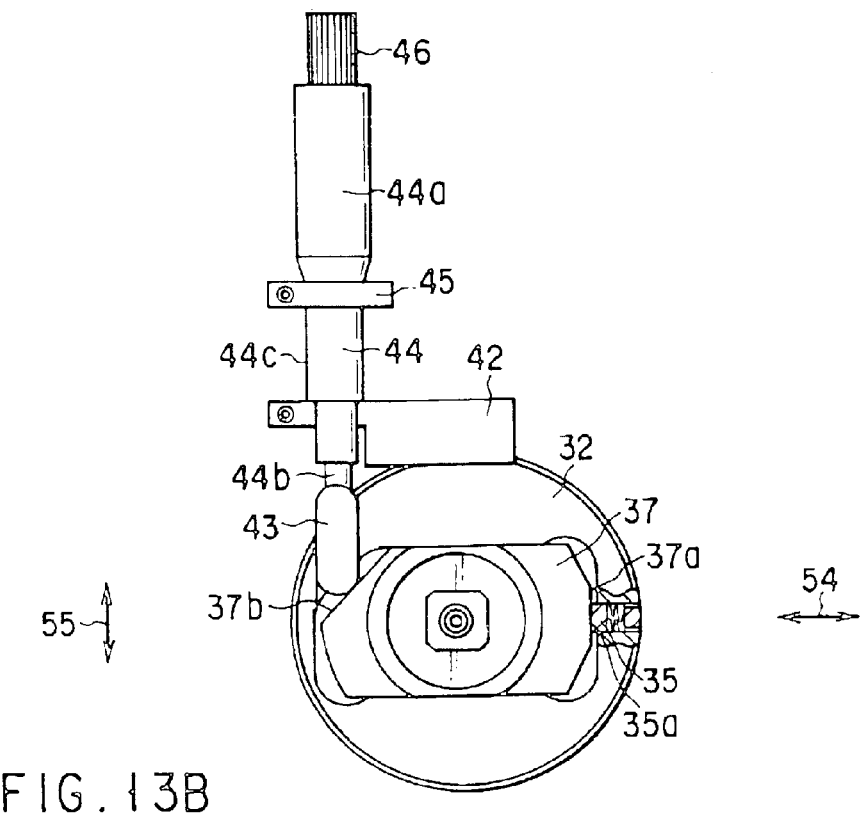

A modification of the fourth embodiment will now be described. FIGS. 13A and 13B illustrate a modification of the fourth embodiment, and like reference numerals denote parts equal to those in FIGS. 12A to 12C, thereby omitting the detailed description.

In FIGS. 13A and 13B, a slide opening portion 28a is provided to the fiber projection tube 28 on the rear side (incident-light projection tube 17 side) of the collimator lens 29. A slider 48 having an opening 48a and an opening 48b is provided to the slide opening portion 28a so as to be capable of moving in the horizontal direction of the page space 54. The slider 48 has a diffused plate 49 fixed to the opening 48a by a ring screw (not shown).

On the other hand, the mirror holding portion 22 of the high-reflection mirror 24 is directly fixed to a fixing portion 50 of the incident-light projection tube 17 by a screw or the like (not shown).

With such a structure, when the opening 48b of the slider 48 is arranged on the optical axis 30 of the fiber projection tube 28 with the total internal reflection illumination being set as described in connection with the fourth embodiment, this state is maintained, but the parallel light 21b is diffused and the illumination is switched to the incident-light fluorescence illumination when the slider 48 is moved and the opening 48a having the diffused plate 49 is arranged on the optical axis 30.

By doing so, the advantages like those in the fourth embodiment can be obtained, and switching between the total internal reflection illumination and the incident-light fluorescence illumination can be realized without using the mercury lamp house 25.

Moreover, in the fourth embodiment, the light stopper 85 which introduces return light of the total reflected laser beam to an outside of the observation optical path is provided between the objective 7 and the fluorescence mirror unit 10a like the first to third embodiments. As a result, the unnecessary light can be prevented from entering the observation optical path, thereby obtaining a further excellent image.

It is to be noted that the high-reflection mirror 24 can be omitted by providing the fiber projection tube 28 coaxially with the incident-light projection tube 17 in the modification of the fourth embodiment, thereby obtaining the further inexpensive structure.

Fifth Embodiment

Figure 14:
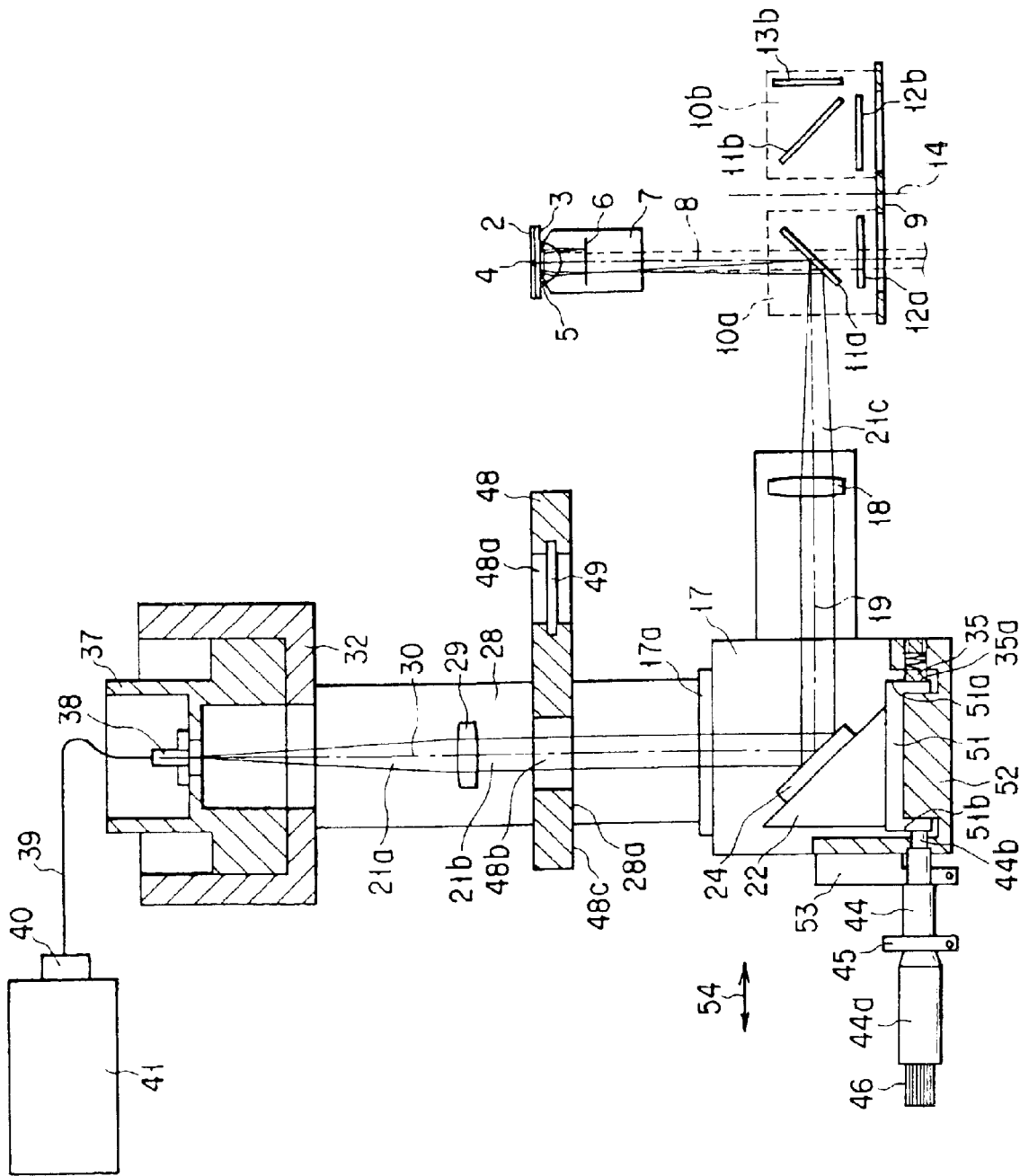
FIG. 14 is a view showing a schematic structure of a fifth embodiment according to the present invention.

The fifth embodiment according to the present invention will now be described. FIG. 14 illustrates the fifth embodiment, and like reference numerals denote parts equal to those in FIG. 12A.

In FIG. 14, a dovetail portion 51 is provided to the mirror holding portion 22 of the high-reflection mirror 24, and this dovetail portion 51 is held so as to be capable of moving in the horizontal direction of the page space 54 in a dovetail groove portion 52 provided to the incident-light projection tube 17.

In the mirror holding portion 22, a contact portion 51a of the dovetail portion 51 is constantly being pressed by the compression coil spring 34 through the adapter 35. On the other hand, a micrometer holding portion 53 is provided on the side surface of the incident-light projection tube 17 on the side opposite to a position where the adapter 35 is arranged, and the micrometer main body 44 is provided to the micrometer holding portion 53. In this case, the micrometer main body 44 brings the end portion 44b of the rotation portion 44a rotated by rotation of the knob 46 into contact with the contact portion 51b of the dovetail portion 51.

By rotating the knob 46 of the micrometer main body 44 in this state, the mirror holding portion 22 can be moved along the reflected light path of the high-reflection mirror 24 by the dovetail portion 51, and a reflection position of the parallel light 21b on the high-reflection mirror 24 can be adjusted.

As a result, the reflected light 21c obtained from the parallel light 21b on the high-reflection mirror 24 can be shifted from the optical axis 19, and an angle of the incident light which outgoes from the objective 7 and enters the sample 2 from the cover glass 3 can be adjusted.

Here, a position of the mirror holding portion 22 is also adjusted by rotating the knob 46 in such a manner that the incidence angle from the cover glass 3 to the sample 2 becomes slightly larger than the critical angle, the notch stopper 45 is brought into contact with the rotation portion 44a of the micrometer main body 44 at this position, and the notch stopper 45 is fastened, thereby performing positioning and fixing with respect to the micrometer main body 44.

As a result, the mirror holding portion 22 can not thereafter move the reflected light 21c from the high-reflection mirror 24 to the optical axis 19 side by the restriction of the notch stopper 45, and movement is restricted to that only in the range of the total internal reflection illumination that the incidence angle from the cover glass 3 to the sample 2 is larger than the critical angle.

In this case, like the modification of the fourth embodiment, the parallel light 21b is diffused by providing the slider 48 and arranging the opening 48a having the diffused plate 49 on the optical axis 30, thereby obtaining the incident-light fluorescence illumination utilizing the laser beam source 41.

In the fifth embodiment, although the mirror holding portion 22 is moved along the reflected light path of the high-reflection mirror 24, the similar advantages can be obtained by moving it along the incident-light path of the high-reflection mirror 24.

It is to be noted that the micrometer main body 44 and the notch stopper 45 which restricts movement of the rotation portion 44a of the micrometer main body 44 are used in the fifth embodiment. However, instead of not using these members, a light shielding plate having a slit hole shifted to the right or left side from the center of the optical axis 30 of the fiber projection tube 28 may be arranged in front of the optical fiber outgoing portion 38, and the optical axis of the outgoing light emitted from the optical fiber outgoing portion 38 may be moved to the optical axis 30 side of the fiber projection tube 28. Even in this case, by preventing the light on the optical axis center side of the outgoing light by using the light shielding plate, switching to the incident-light illumination can be avoided, and movement can be restricted to that only in the range of the total internal reflection illumination. In this case, switching between the total internal reflection illumination and the incident-light fluorescence illumination utilizing the laser beam source 41 can be performed by moving the high-reflection mirror 24 so as to be inserted into or removed from the light path as with the fourth embodiment.

Description will now be given as to a method for realizing the total internal reflection illumination. In the confirmation method when the incidence angle of the illumination light from the cover glass 3 to the sample 2 exceeds the critical angle, the eyepiece (not shown) attached to the body tube (not shown) is replaced with a CT (centering telescope) (not shown), and a lens group (not shown) in the vicinity of the rear side focal position 6 of the objective 7 is watched by using this CT. The self-fluorescence of the lens group is generated by the light obtained by transmission of the illumination light through the lens group (not shown) of the objective 7, and a bright spot can be observed by the lens group in the vicinity of the rear side focal position 6 at which the light is condensed.

When the incidence angle from the cover glass 3 to the sample 2 is smaller than the critical angle, only one bright spot on the incidence angle side of the illumination light is observed at the rear side focal position 6 of the objective 7, but two bright spots which are symmetric so as to sandwich the optical axis can be observed in the vicinity of the inner side of the outer periphery of the rear side focal position 6 of the objective 7 when the incidence angle is larger than the critical angle. The second bright spot is obtained because the illumination light totally reflected on the interface between the cover glass 3 and the sample 2 returns to the objective 7 from the end of the objective 7.

By gradually changing from the state that the incidence angle of the illumination light from the cover glass 3 to the sample 2 is smaller than the critical angle to the state that it is larger than the critical angle, one bright spot first gradually moves in the outer peripheral direction from the central side of the optical axis of the objective. Then, when the incidence angle exceeds the critical angle, the second bright point appears symmetrically so as to sandwich the optical axis of the objective, and the notch stopper 45 is fixed to the micrometer main body 44 when the second bright spot appears.

Description will now be given as to the definition of the approximate total internal reflection illumination and effects and advantages obtained when the present invention is applied to the fourth embodiment based on the fourth embodiment. Since the structure is similar to that of the fourth embodiment, the explanation thereof is omitted. Further, in regard to the effects and the advantages, parts equal to those in the fourth embodiments are omitted, and description will be given as to only different parts.

The approximate total internal reflection illumination is first defined as follows. In the total internal reflection illumination, the evanescent light 4 is generated in the range of several hundred nm on the sample 2 side which is the low refractive index medium side on the interface between the cover glass 3 and the sample 2. By setting the incidence angle from the cover glass 3 to the sample 2 slightly smaller than the critical angle, the refracted light from the cover glass 3 to the sample 2 is emitted from the cover glass 3 along the vicinity on the interface of the sample 2. In this illumination method, a range of several nm in the sample 2 in the vicinity of the cover glass 3 can be illuminated. This is one type of dark field illumination, and this illumination method is referred to as "approximate total internal reflection illumination" in this specification.

The effects of the approximate total internal reflection illumination will now be described. Here, description will be given as to only the approximate total internal reflection illumination using the laser beam source 41, and the explanation about the incident-light fluorescence illumination using the mercury burner 26 as a light source will be omitted. Like the fourth embodiment, the knob 46 of the micrometer 44 is first rotated, and illumination is switched to the total internal reflection illumination that the incidence angle from the cover glass 3 to the sample 2 is larger than the critical angle. Then, the knob 46 of the micrometer main body 44 is gradually rotated in the direction that the incidence angle from the cover glass 3 to the sample 2 becomes smaller, and the illumination light is adjusted to be the above-described approximate total internal reflection illumination.

In this state, like the fourth embodiment, movement of the optical fiber outgoing portion 38 is restricted to only the range of the approximate total internal reflection illumination and the total internal reflection illumination by positioning and fixing the notch stopper 45 to the micrometer main body 44.

The advantages will now be described. The illumination range is only the sample 2 in the range of several μm in the vicinity of the top face of the cover glass 3 even in case of the approximate total internal reflection illumination, and color degradation of the entire sample 2 can be avoided like the fourth embodiment. Also, the illumination light can be moved in the direction away from the optical axis in order to change to the total internal reflection illumination.

Besides the above advantages, an area which can not be observed with the evanescent light 4 generated by the total internal reflection illumination or the sample 2 which can not be observed because the generated fluorescence is too weak can be observed. Furthermore, the fluorescence is generated from the entire sample 2 in the incident-light fluorescence illumination using the mercury burner 26 as a light source, whereas the unnecessary fluorescence can be eliminated and observation with less background noise is enabled since the illumination range can be restricted to the range of several μm in the vicinity of the cover glass 3 in the approximate total internal reflection illumination.

Figure 15C:
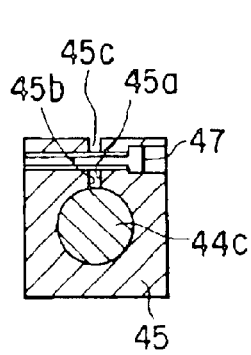
FIGS. 15A to 15C show the case where the present invention is applied to the microscope with upright frame.
Figure 15B:
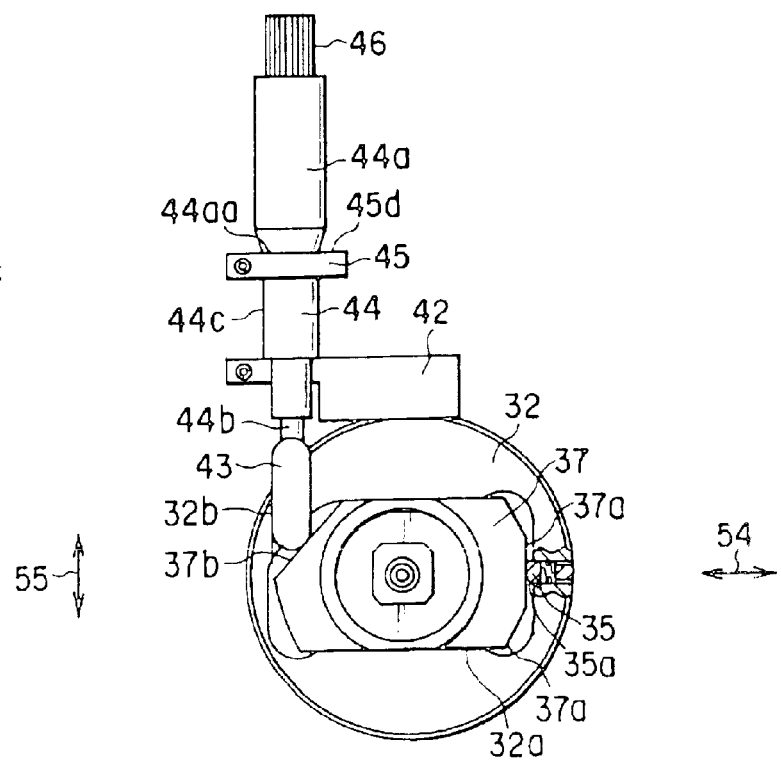
Figure 15A:
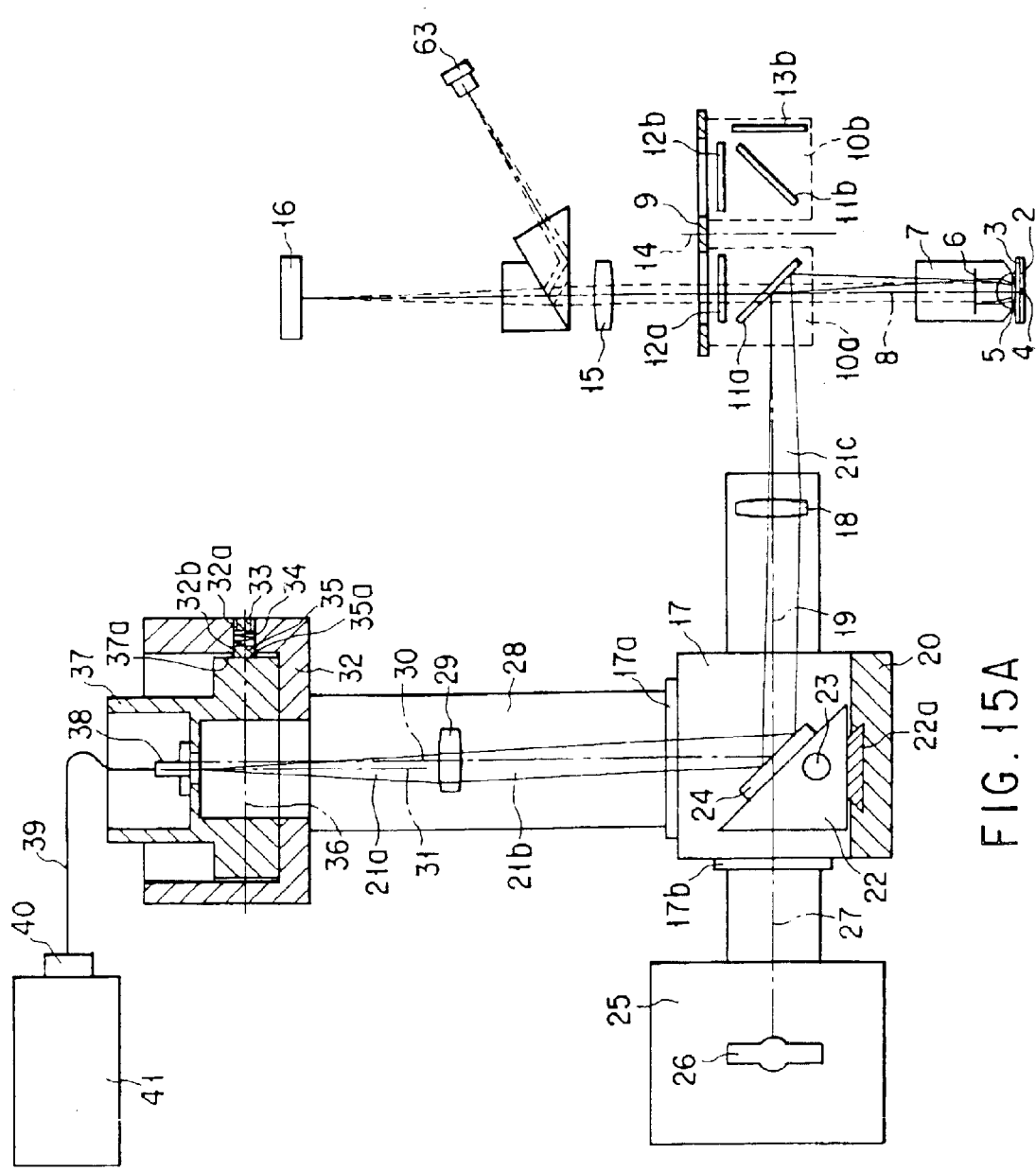

Although description has been give as to the inverted type microscope in the fourth and fifth embodiments mentioned above, the present invention can be of course applied to the erect type microscope. FIGS. 15A to 15C show the case where the present invention is applied to the microscope with upright frame. In FIGS. 15A to 15C, since respective structures are the same as above, like reference numerals are given, thereby omitting the explanation.

The following inventions can be extracted from each of the foregoing embodiments. It is to be noted that each of the following inventions may be appropriately combined and applied or it may be applied independently.

A total internal reflection illumination apparatus according to the first aspect of the present invention apparatus applied to a microscope which illuminates a sample through an objective having a numerical aperture enabling total internal reflection illumination, is characterized by comprising: a first total internal reflection mirror which is arranged in the vicinity of an outermost peripheral part of an observation optical path of the microscope to reflect an incident illumination light in a direction of the objective; a second total internal reflection mirror which is arranged at a symmetrical position with the first total internal reflection mirror to sandwich an observation optical axis and reflects return light reflected on a surface of the sample in a direction different from the illumination optical path; and a return light dimming part configured to dim the return light reflected by the second total internal reflection mirror.

In the first aspect the flowing modes are preferable. The following modes may be applied independently or in combining them.

(1) The return light dimming part has an external set portion which is set outside the microscope.

(2) The return light dimming part is connected to the external set portion through an optical fiber.

(3) At least a part of the total internal reflection illumination apparatus is set to a support member which insertable or removable to the observation optical path of the microscope.

(4) The first total internal reflection mirror and the second total internal reflection mirror are arranged at positions where they are symmetrical with each other to sandwich an optical axis of the objective, and the first total internal reflection mirror and the second total internal reflection mirror move in such a manner a distance between the optical axis of the objective and the first total internal reflection mirror and a distance between the optical axis of the objective and the second total internal reflection mirror become equal to each other.

(5) One of the microscope and the support member has a switching part configured to turn on or turn off the illumination light in cooperation with insertion or removal of the support member.

(6) A switching part configured to switch total internal reflection illumination and approximate total internal reflection illumination by changing an incidence angle of the illumination light with which the sample is irradiated; and a restricting part configured to restrict the incidence angle of the illumination light to the sample to a range where total internal reflection illumination and approximate total internal reflection illumination can be obtained are further provided.

A microscope according to the second aspect of the present invention is characterized by comprising: a light source which emits predetermined light; a total internal reflection illumination apparatus according to above-mentioned total internal reflection illumination apparatus, which irradiates a sample with the light from the light source through an objective; and an image pickup device which images the light from the sample as an image.

In the second aspect the flowing modes are preferable. The following modes may be applied independently or in combining them.

(1) The light source has an optical fiber having an outgoing end provided to be movable in a direction vertical to the optical axis, and the restricting part restricts a movement range of the outgoing end of the optical fiber in the direction vertical to the optical axis to the range where total internal reflection illumination and approximate total internal reflection illumination can be obtained.

(2) An optical element which is insertably and removably arranged to the light path between the light source and the objective and diffuses the illumination light is further provided.

(3) A light path between the light source and the objective has a reflection member arranged movably along a direction of the light path, and the restricting part restricts a movement range of the reflection member along the direction of the light path to the range where total internal reflection illumination and approximate total internal reflection illumination can be obtained.

(4) An optical element which is insertably and removably arranged to the light path between the light source and the objective and diffuses the illumination light is further provided.

A microscope according to the third aspect of the present invention is characterized by comprising: a changing part configured to change an incidence angle of illumination light which is emitted onto a sample from a light source through an objective and enables switching between total internal reflection illumination and approximate total internal reflection illumination; and a restricting part configured to restrict the incidence angle of the illumination light to the sample through the objective to a range where total internal reflection illumination and approximate total internal reflection illumination can be obtained.

In the third aspect the flowing modes are preferable. The following modes may be applied independently or in combining them.

(1) A dimming part configured to dim light reflected by the sample is further provided.

(2) The light source has an optical fiber having an outgoing end provided to be movable in a direction vertical to an optical axis, and the restricting part restricts a movement range of the outgoing end of the optical fiber in the direction vertical to the optical axis to the range where total internal reflection illumination and approximate total internal reflection illumination can be obtained.

(3) An optical element which is insertably and removably arranged the light path between the light source and the objective and diffuses the illumination light is further provided.

(4) A light path between the light source and the objective has a reflection member provided so as to be capable of moving along the light path direction, and the restricting part restricts a movement range of the reflection member along the light path direction to the range where total internal reflection illumination and approximate total internal reflection illumination can be obtained.

(5) An optical element which is insertably and removably arranged to the light path between the light source and the objective and diffuses the illumination light is further provided.

Moreover, the respective foregoing embodiments include the following inventions, for example.

(1) A total internal reflection illumination apparatus applied to a microscope which illuminates a sample through an objective having a numerical aperture enabling the total internal reflection illumination, wherein the illumination light incident from the outside of the microscope is reflected in a direction of an objective by a first total internal reflection mirror arranged in the vicinity of an outermost part of an observation optical path, the return light totally reflected on the surface of the specimen is reflected by a second total internal reflection mirror arranged symmetrical with the first total internal reflection mirror so as to sandwich the observation optical axis and it is ended by light trapping part.

(2) In The total internal reflection illumination apparatus according to (1), wherein the light trapping part is arranged outside the microscope through an optical fiber.

(3) In The total internal reflection illumination apparatus according to (1), wherein the total internal reflection illumination apparatus of the microscope can be integrally moved away from the observation optical path, and the illumination light is turned on/off in cooperation with insertion to or removal from the observation optical path.

The present invention is not restricted to each of the foregoing embodiments, and it can be modified on the embodying stage in many ways without changing its gist. In addition, the respective foregoing embodiments can be appropriately combined and applied.

Additionally, the foregoing embodiments include various kinds of inventions, and a variety of inventions can be extracted from appropriate combinations of a plurality of disclosed structural requirements. For example, even if some of the structural requirements are deleted from all the structural requirements disclosed in the embodiments, the problems described in the section "problems to be solved by the invention" can be solved, and the structures obtained by deleting the structural requirements can be extracted as inventions when the advantages described in the section "advantages of the invention" can be obtained.

According to each of the embodiments of the present invention, it is possible to provide the total internal reflection illumination apparatus of the microscope which can constantly assure a good fluorescence observation image.

As a result, the observation light beam of the fluorescence generated from the specimen can be set so as not to cross the illumination light beam reflected by the first total internal reflection mirror on the observation optical path or the return light beam entering the second total internal reflection mirror, and the illumination light beam with which the specimen is irradiated and the return light beam after total internal reflection can be set so as not to cross each other.

Further, according to the embodiments of the present invention, since the return light beam reflected by the second total internal reflection mirror is positively removed to the outside of the microscope, the possibility that the scattered light of the return light beam may permeate the observation optical path can be further reduced.

Furthermore, according to the present invention, since the illumination light can be turned on/off in cooperation with insertion and removal of the support member, the illumination light can be automatically stopped when the support member is removed.

As a result, according to the present invention, the incidence angle of the illumination light to the sample through the objective can be constantly restricted to the range where the total internal reflection illumination and the approximate total internal reflection illumination can be obtained. Therefore, color degradation of the entire sample due to the strong light of the incident-light fluorescence illumination can be prevented, and the stable fluorescence observation based on the total internal reflection illumination and the approximate total internal reflection illumination can be obtained. Furthermore, since the incidence angle of the illumination light to the sample from the objective can be constantly adjusted in the range of the total internal reflection illumination and the approximate total internal reflection illumination, the operability can be improved.

As described above, according to the present invention, it is possible to provide the microscope which can realize the stable fluorescence observation based on the total internal reflection illumination and the approximate total internal reflection illumination and improve the operability.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A total internal reflection illumination apparatus applied to a microscope which illuminates a sample through an objective having a numerical aperture enabling total internal reflection illumination, comprising:

a first total internal reflection mirror which is arranged in the vicinity of an outermost peripheral part of an observation optical path of the microscope to reflect an incident illumination light in a direction of the objective;

a second total internal reflection mirror which is arranged at a symmetrical position with the first total internal reflection mirror to sandwich an observation optical axis and reflects return light reflected on a surface of the sample in a direction different from the illumination optical path; and a return light dimming part configured to dim the return light reflected by the second total internal reflection mirror.

2. The total internal reflection illumination apparatus according to claim 1, wherein the return light dimming part has an external set portion which is set outside the microscope.

3. The total internal reflection illumination apparatus according to claim 2, wherein the return light dimming part is connected to the external set portion through an optical fiber.

4. The total internal reflection illumination apparatus according to claim 1, wherein at least a part of the total internal reflection illumination apparatus is set to a support member which insertable or removable to the observation optical path of the microscope.

5. The total internal reflection illumination apparatus according to claim 4, wherein one of the microscope and the support member has a switching part configured to turn on or turn off the illumination light in cooperation with insertion or removal of the support member.

6. The microscope according to claim 5, further comprising:

a switching part configured to switch total internal reflection illumination and approximate total internal reflection illumination by changing an incidence angle of the illumination light with which the sample is irradiated; and a restricting part configured to restrict the incidence angle of the illumination light to the sample to a range where total internal reflection illumination and approximate total internal reflection illumination can be obtained.

7. The total internal reflection illumination apparatus according to claim 1, wherein the first total internal reflection mirror and the second total internal reflection mirror are arranged at positions where they are symmetrical with each other to sandwich an optical axis of the objective, and the first total internal reflection mirror and the second total internal reflection mirror move in such a manner a distance between the optical axis of the objective and the first total internal reflection mirror and a distance between the optical axis of the objective and the second total internal reflection mirror become equal to each other.

8. A microscope comprising:

a light source which emits predetermined light;

a total internal reflection illumination apparatus according to claim 1, which irradiates a sample with the light from the light source through an objective; and an image pickup device which images the light from the sample as an image.

9. The microscope according to claim 8, wherein the light source has an optical fiber having an outgoing end provided to be movable in a direction vertical to the optical axis, and the restricting part restricts a movement range of the outgoing end of the optical fiber in the direction vertical to the optical axis to the range where total internal reflection illumination and approximate total internal reflection illumination can be obtained.

10. The microscope according to claim 9, further comprising an optical element which is insertably and removably arranged to the light path between the light source and the objective and diffuses the illumination light.

11. The microscope according to claim 8, wherein a light path between the light source and the objective has a reflection member arranged movably along a direction of the light path, and the restricting part restricts a movement range of the reflection member along the direction of the light path to the range where total internal reflection illumination and approximate total internal reflection illumination can be obtained.

12. The microscope according to claim 11, further comprising an optical element which is insertably and removably arranged to the light path between the light source and the objective and diffuses the illumination light.

* * * * *